United States Patent
Lee

(10) Patent No.: US 10,728,515 B2
(45) Date of Patent: Jul. 28, 2020

(54) IMAGE DEVICE FOR GENERATING PANORAMA DEPTH IMAGES AND RELATED IMAGE DEVICE

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 49 days.

(21) Appl. No.: 15/903,052

(22) Filed: Feb. 23, 2018

(65) Prior Publication Data

US 2018/0295341 A1 Oct. 11, 2018

Related U.S. Application Data

(60) Provisional application No. 62/462,363, filed on Feb. 23, 2017, provisional application No. 62/511,317, (Continued)

(51) Int. Cl.
| | |
|---|---|
| *H04N 7/00* | (2011.01) |
| *H04N 13/128* | (2018.01) |
| *H04N 13/282* | (2018.01) |
| *H04N 13/25* | (2018.01) |
| *H04N 5/232* | (2006.01) |

(Continued)

(52) U.S. Cl.
CPC ......... *H04N 13/128* (2018.05); *G01B 11/245* (2013.01); *G01B 11/2545* (2013.01); *G06T 3/4038* (2013.01); *G06T 7/55* (2017.01); *H04N 5/2251* (2013.01); *H04N 5/23238* (2013.01); *H04N 5/247* (2013.01); *H04N 13/25* (2018.05); *H04N 13/271* (2018.05); *H04N 13/282* (2018.05); *G01B 2210/52* (2013.01);
(Continued)

(58) Field of Classification Search
CPC ................ G06T 17/00; G06T 19/00; G06T 2207/10028; G01C 21/005; G01B 2210/52; H04N 5/23238; H04N 13/271
See application file for complete search history.

(56) References Cited

U.S. PATENT DOCUMENTS

2014/0153916 A1* 6/2014 Kintner ............... H04N 5/2251
396/419
2016/0088280 A1* 3/2016 Sadi ..................... H04N 5/247
348/48

(Continued)

FOREIGN PATENT DOCUMENTS

| CN | 105472372 A | 4/2016 |
|---|---|---|
| CN | 105659592 A | 6/2016 |
| TW | I555379 B | 10/2016 |

*Primary Examiner* — Peet Dhillon
(74) *Attorney, Agent, or Firm* — Winston Hsu

(57) ABSTRACT

An image device for generating panoramic depth images includes at least two image capturing groups. Each image capturing group of the at least two image capturing groups includes at least three image capturers. A size of each image capturer of the at least three image capturers is a first length, a distance between two adjacent capturing devices of the at least three image capturers is a second length, and a ratio of the second length to the first length is not less than a predetermined value. Depths of at least three depth maps corresponding to the at least two image capturing groups are applied to generating a panoramic depth image.

16 Claims, 29 Drawing Sheets

Related U.S. Application Data filed on May 25, 2017, provisional application No. 62/599,794, filed on Dec. 18, 2017.

(51) Int. Cl.
| | |
|---|---|
| *H04N 13/271* | (2018.01) |
| *H04N 5/225* | (2006.01) |
| *G06T 7/55* | (2017.01) |
| *G01B 11/245* | (2006.01) |
| *G01B 11/25* | (2006.01) |
| *H04N 5/247* | (2006.01) |
| *G06T 3/40* | (2006.01) |
| *H04N 13/00* | (2018.01) |

(52) U.S. Cl.
CPC .............. *G06T 2207/30252* (2013.01); *H04N 2013/0081* (2013.01)

(56) References Cited

U.S. PATENT DOCUMENTS

2018/0139431 A1* 5/2018 Simek .................. H04N 13/254
2018/0143523 A1* 5/2018 Chapdelaine-Couture .................. G03B 37/04
2019/0020829 A1* 1/2019 Nebiker .................. B60R 11/04

* cited by examiner

IMAGE DEVICE FOR GENERATING PANORAMA DEPTH IMAGES AND RELATED IMAGE DEVICE

CROSS REFERENCE TO RELATED APPLICATION

This application claims the benefit of U.S. Provisional Application No. 62/462,363, filed on Feb. 23, 2017 and entitled "Camera with Panoramic Image and Depth Information," the benefit of U.S. Provisional Application No. 62/511,317, filed on May 25, 2017 and entitled "System and Camera with Panoramic Image and Depth Information," and the benefit of U.S. Provisional Application No. 62/599,794, filed on Dec. 18, 2017 and entitled "IMAGE DEVICE FOR DEPTH INFORMATION/PANORAMIC IMAGE AND APPLICATION THEREOF," the contents of which are incorporated herein by reference.

BACKGROUND OF THE INVENTION

1. Field of the Invention

The present invention relates to an image device for generating panoramic depth images, and particularly to an image device for generating panoramic depth images that can reduce mechanism contradiction.

2. Description of the Prior Art

Please refer to FIGS. 1-3. FIGS. 1, 2 are diagrams illustrating a depth camera 102, and FIG. 3 is a diagram illustrating a panoramic camera 104. As shown in FIG. 1, the depth camera 102 is a depth camera utilizing a triangulation principle, wherein a predetermined distance BL (that is, a baseline) needs to exist between two image capturers 1022, 1024 included in the depth camera 102 to generate a depth map, and the greater the predetermined distance BL is, the more precise the depth map is. In addition, another implement way of the depth camera 102 is that the image capturer 1024 of the depth camera 102 is replaced with a structured light generation unit 1026 (as shown in FIG. 2).

As shown in FIG. 3, a panoramic camera 104 has four cameras 1042-1048, wherein a sum of angles of visual fields FOV1, FOV2, FOV3, FOV4 of the four cameras 1042-1048 is greater than 360 degree, and a number of cameras included in the panoramic camera 104 is determined by visual field of an individual camera. When the panoramic camera 104 generates a panoramic image, a characteristic of the panoramic camera 104 requires that an optical center of each camera of the four cameras 1042-1048 is maintained at the same position. However, the panoramic camera 104 cannot physically achieve the above-mentioned characteristic of the panoramic camera 104. That is, the panoramic camera 104 only reduces a distance between the optical center of the each camera and optical centers of adjacent cameras as possible to reduce parallax between the four cameras 1042-1048.

Because of the above-mentioned characteristic of the depth camera 102 (the above-mentioned characteristic of the depth camera 102 requires that the predetermined distance BL is greater) and the above-mentioned characteristic of the panoramic camera 104 (the above-mentioned characteristic of the panoramic camera 104 requires that the optical center of the each camera of the four cameras 1042-1048 is maintained at the same position), when the prior art combines the depth camera 102 with the panoramic camera 104 to generate a panoramic depth image, the prior art will have mechanism contradiction. Therefore, how to solve mechanism contradiction generated by the prior art is an important issue of the present invention.

SUMMARY OF THE INVENTION

An embodiment of the present invention provides an image device for generating panoramic depth images. The image device includes at least two image capturing groups. Each image capturing group of the at least two image capturing groups includes at least three image capturers, a distance between two adjacent image capturers of the at least three image capturers is a first length, a distance between each image capturer of the at least three image capturers and at least one corresponding image capturer of other image capturing groups of the at least two image capturing groups is a second length, and a ratio of the second length to the first length is not less than 1. Depths of at least three depth maps corresponding to the at least two image capturing groups are applied to generating a panoramic depth image.

Another embodiment of the present invention provides an image device for generating panoramic depth images. The image device includes at least two image capturing groups. Each image capturing group of the at least two image capturing groups includes at least two image capturers, a distance between two adjacent image capturers of the at least two image capturers is a first length, a distance between each image capturer of the at least two image capturers and at least one corresponding image capturer of other image capturing groups of the at least two image capturing groups is a second length, and a ratio of the second length to the first length is not less than 1. Depths of at least two depth maps corresponding to the at least two image capturing groups are applied to generating a panoramic depth image.

Another embodiment of the present invention provides an image device for generating panoramic depth images. The image device includes at least one image capturing group and at least one light source. Each image capturing group of the at least one image capturing group includes at least one image capturer. At least one light source is used for emitting emission light, wherein an image including the emission light captured by the each image capturing group is used for generating a depth map corresponding to the each image capturing group, or flight time corresponding to the emission light passing from the at least one light source to each object and passing from the each object to the each image capturing group after the emission light is reflected by the each object is used for generating the depth map corresponding to the each image capturing group. Depth of the depth map corresponding to the each image capturing group is applied to generate a panoramic depth image.

Another embodiment of the present invention provides an image device for generating panoramic images. The image device includes a panoramic image generator. The panoramic image generator is used for receiving a plurality of depth maps, and generating a panoramic image corresponding to the plurality of depth maps according to the plurality of depth maps, wherein a sum of view angles corresponding to the plurality of depth maps is not less than 360 degree.

Another embodiment of the present invention provides an image device for generating depth images. The image device includes a depth image generator. The depth image generator is used for receiving a first panoramic image and a corresponding second panoramic image, dividing the first panoramic image and the corresponding second panoramic image into a plurality of first divided images and a plurality of second divided images according to a plurality of view angles respectively, projecting each first divided image of the plurality of first divided images and a corresponding second divided image on a corresponding projection plane to generate a first projection image and a second projection image, and generating a depth map corresponding to the each first divided image according to the first projection image and the second projection image. A sum of the plurality of view angles is not less than 360 degree.

Another embodiment of the present invention provides an image device for generating images. The image device includes an image generator. The image generator is used for receiving a panoramic depth image, dividing the panoramic depth image into a plurality of divided images according to a plurality of view angles, projecting each divided image of the plurality of divided images on a corresponding projection plane to generate a projection image corresponding to the each divided image, and converting each depth value of the projection image into a converted depth value, wherein the each divided image corresponds to a view angle of the plurality of view angles, the view angle corresponds to an optical center plane, the each depth value corresponds to an optical center located at the optical center plane, and the corresponding projection plane is parallel to the optical center plane. A sum of the plurality of view angles is not less than 360 degree.

The present invention provides an image device for generating panoramic depth images and related image device. Because a distance between an optical center of each image capturer of each image capturing group of the image device and optical centers of adjacent image capturers of the each image capturing group is much less than a distance between the optical center of the each image capturer and an optical center of at least one corresponding image capturer of other image capturing groups of the image device, compared to the prior art, the image device not only can provide a panoramic depth image, a panoramic image, or a depth image, but can also solve mechanism contradiction generated by the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
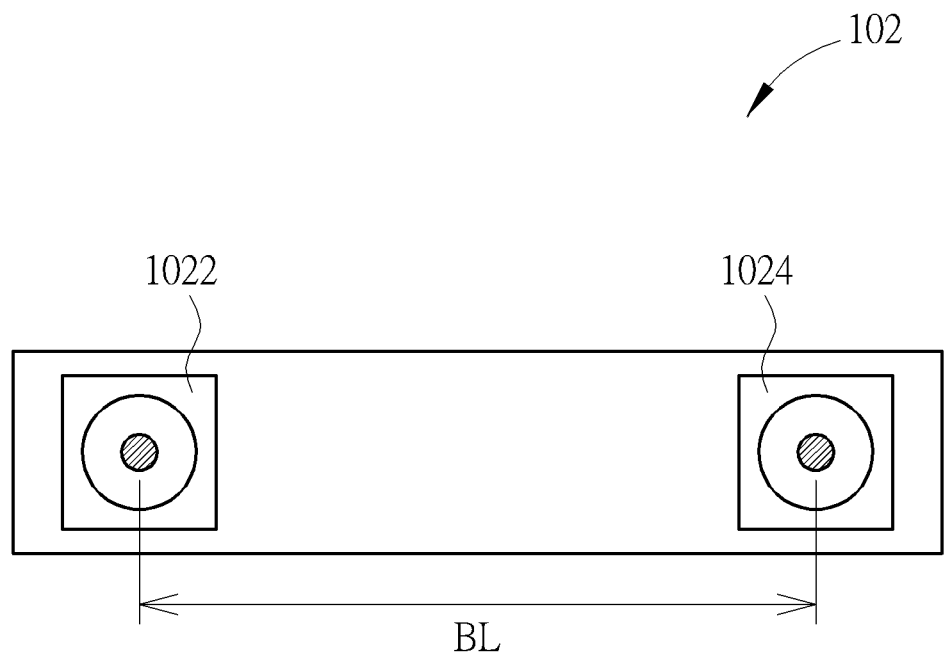
FIGS. 1, 2 are diagrams illustrating a depth camera.
Figure 2:
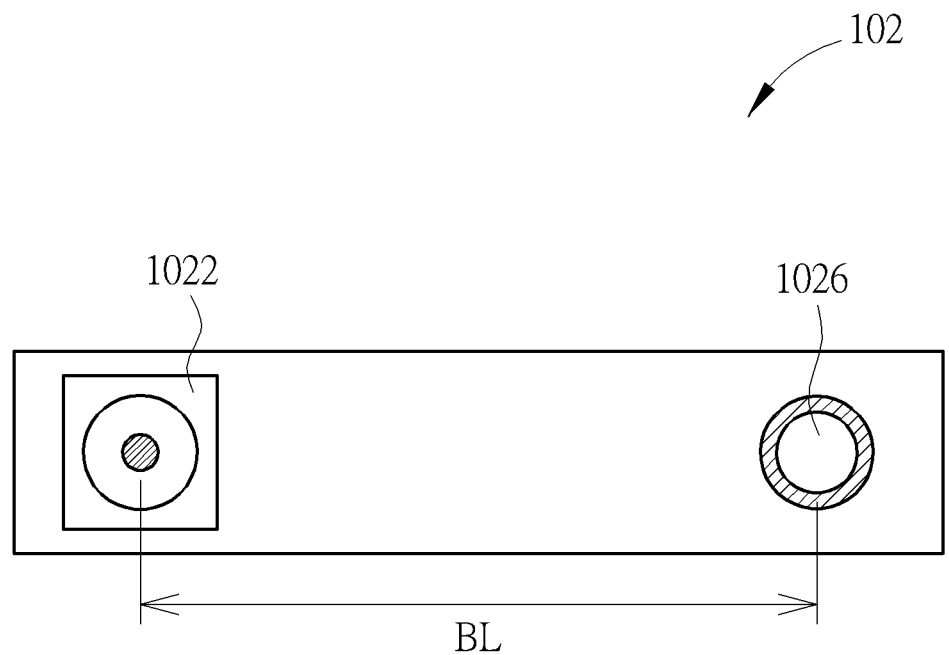
Figure 3:
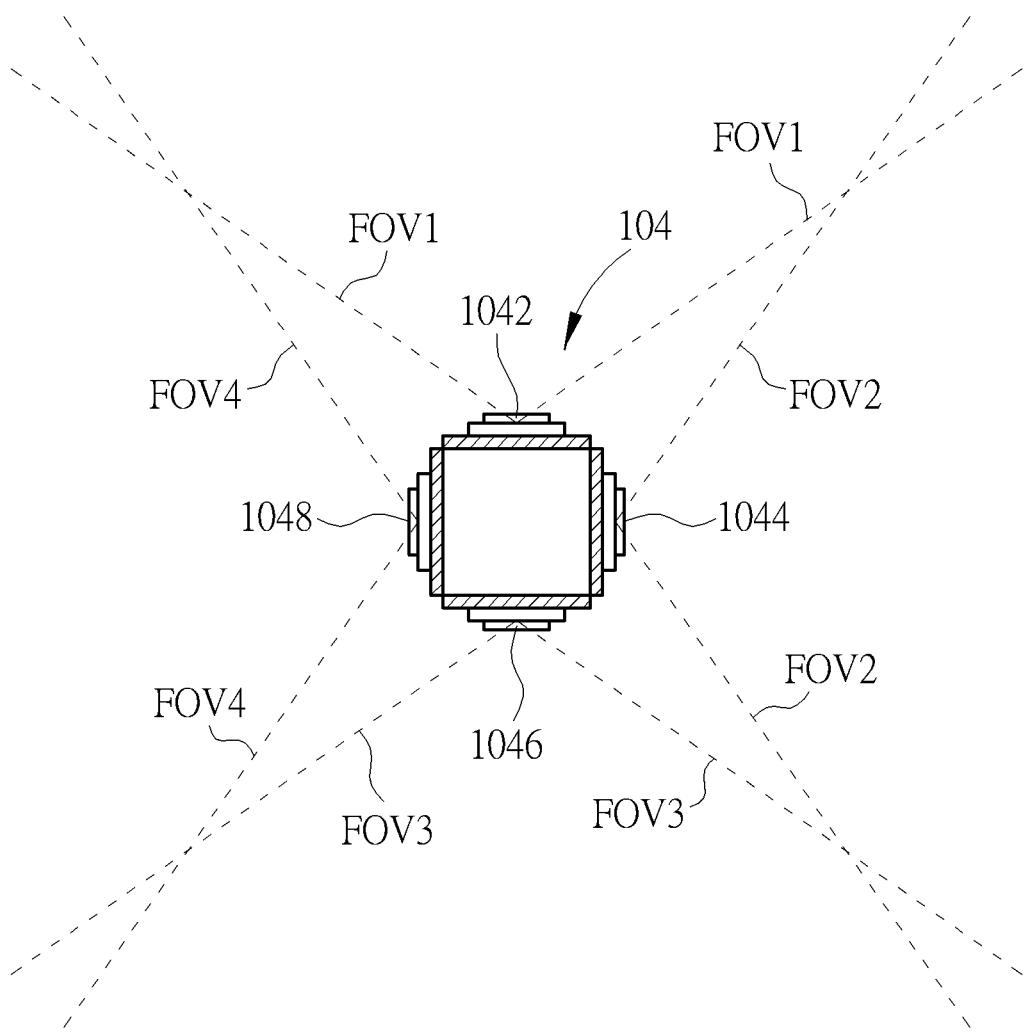
FIG. 3 is a diagram illustrating a panoramic camera.
Figure 4A:
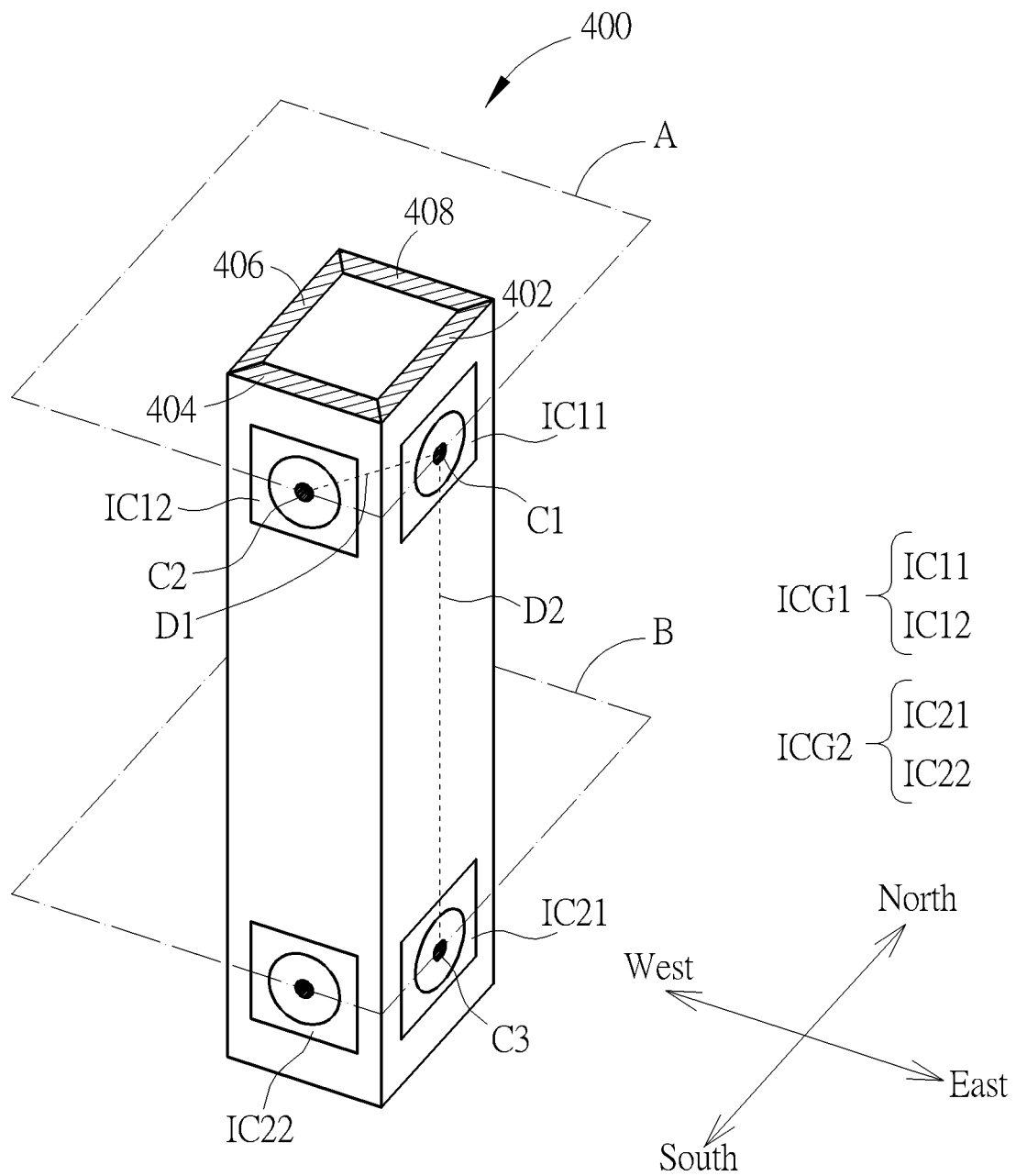
FIG. 4A is a diagram illustrating an image device for generating panoramic depth images according to a first embodiment of the present invention.
Figure 4B:
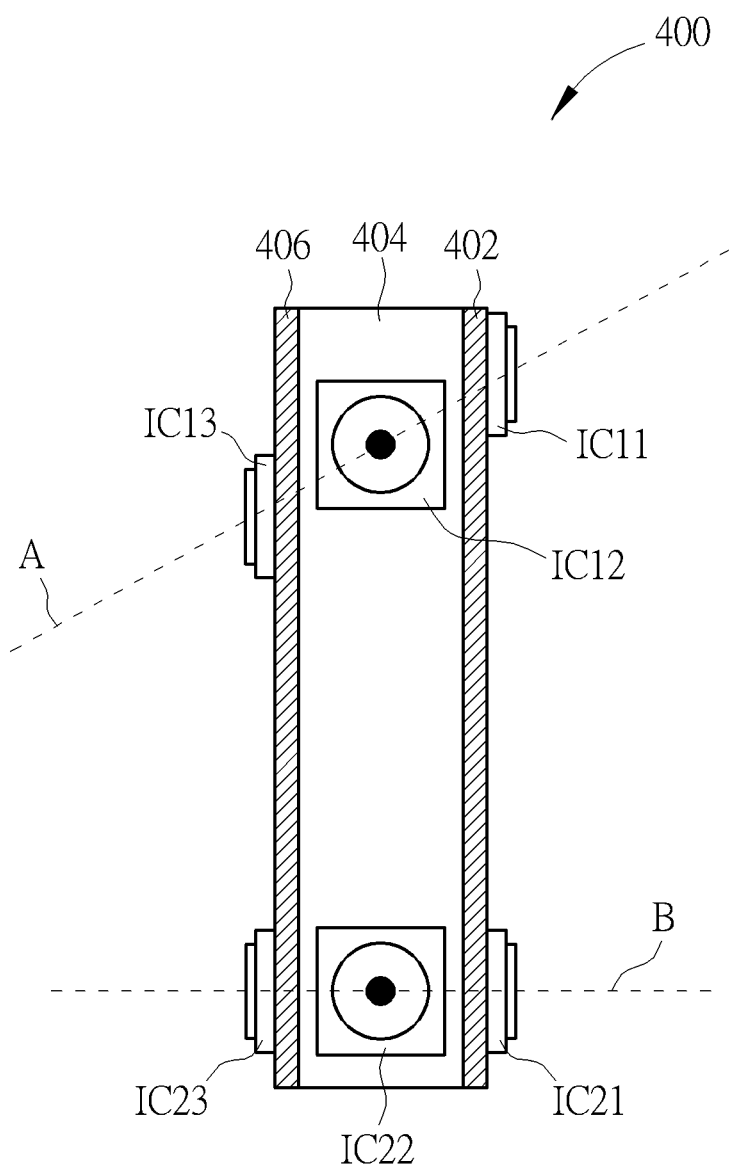
FIG. 4B is a diagram illustrating planes where the image capturing groups are located being not parallel each other.

Please refer to FIG. 4A. FIG. 4A is a diagram illustrating an image device 400 for generating panoramic depth images according to a first embodiment of the present invention, wherein the image device 400 includes two image capturing groups ICG1, ICG2 and 4 supporting units 402, 404, 406, 408, each image capturing group of the image capturing groups ICG1, ICG2 includes 4 image capturers, and each image capturer of the 4 image capturers is a non-fisheye image capturer. But, in another embodiment of the present invention, each image capturer of the 4 image capturers is a fisheye image capturer. In addition, FIG. 4A only shows image capturers IC11, IC12 of the image capturing group ICG1, and image capturers IC21, IC22 of the image capturing group ICG2. But, the present invention is not limited to the image device 400 only including the image capturing groups ICG1, ICG2 and the supporting units 402, 404, 406, 408, and the each image capturing group of the image capturing groups ICG1, ICG2 including 4 image capturers. As shown in FIG. 4A, a plane A where 4 image capturers included in the image capturing group ICG1 are located and a plane B where 4 image capturers included in the image capturing group ICG2 are located can be parallel each other. However, in another embodiment of the present invention, as shown in FIG. 4B, the plane A and the plane B are not parallel each other because of a mechanism design factor of the image device 400.

Please further refer to FIG. 4A. each image capturer of 4 image capturers included in the image capturing group ICG1 is installed on a corresponding supporting unit (e.g. the image capturer IC11 is installed on the supporting unit 402); similarly, each image capturer of 4 image capturers included in the image capturing group ICG2 is also installed on a corresponding supporting unit (e.g. the image capturer IC21 is installed on the supporting unit 402). In addition, a distance D1 between an optical center C1 of the image capturer IC11 and an optical center C2 of the image capturer IC12 (wherein the image capturer IC12 is adjacent to the image capturer IC11) is much less than a distance D2 between the optical center C1 of the image capturer IC11 and an optical center C3 of the image capturer IC21. That is to say, a ratio of the distance D2 to the distance D1 is not less than 1. In addition, in one embodiment of the present invention, a size of the image capturer IC11 is a first length, the distance D1 between the optical center C1 of the image capturer IC11 and the optical center C2 of the image capturer IC12 is a second length, and a ratio of the second length and the first length is not less than 1, wherein the size of the image capturer IC11 can be a size of a lens of the image capturer IC11 or a size of the support unit 402 for supporting the image capturer IC11. When the image device 400 is installed in a portable device (e.g. a smart phone), because the portable device is used for generating a depth map corresponding to a shorter distance (e.g. corresponding to face recognition of a user), the ratio of the second length and the first length is equal to a first value; when the image device 400 is installed in an interactive game device, because the interactive game device is used for generating a depth map corresponding to a longer distance (e.g. corresponding to gestures or body movement of the user), the ratio of the second length and the first length is equal to a second value, wherein the first value is less than the second value (e.g. the first value is 12 and the second value is 18). In addition, when the image device 400 has a plurality of image capturers arranged side-by-side closely, the ratio of the second length and the first length will approach 1.

Figure 5A:
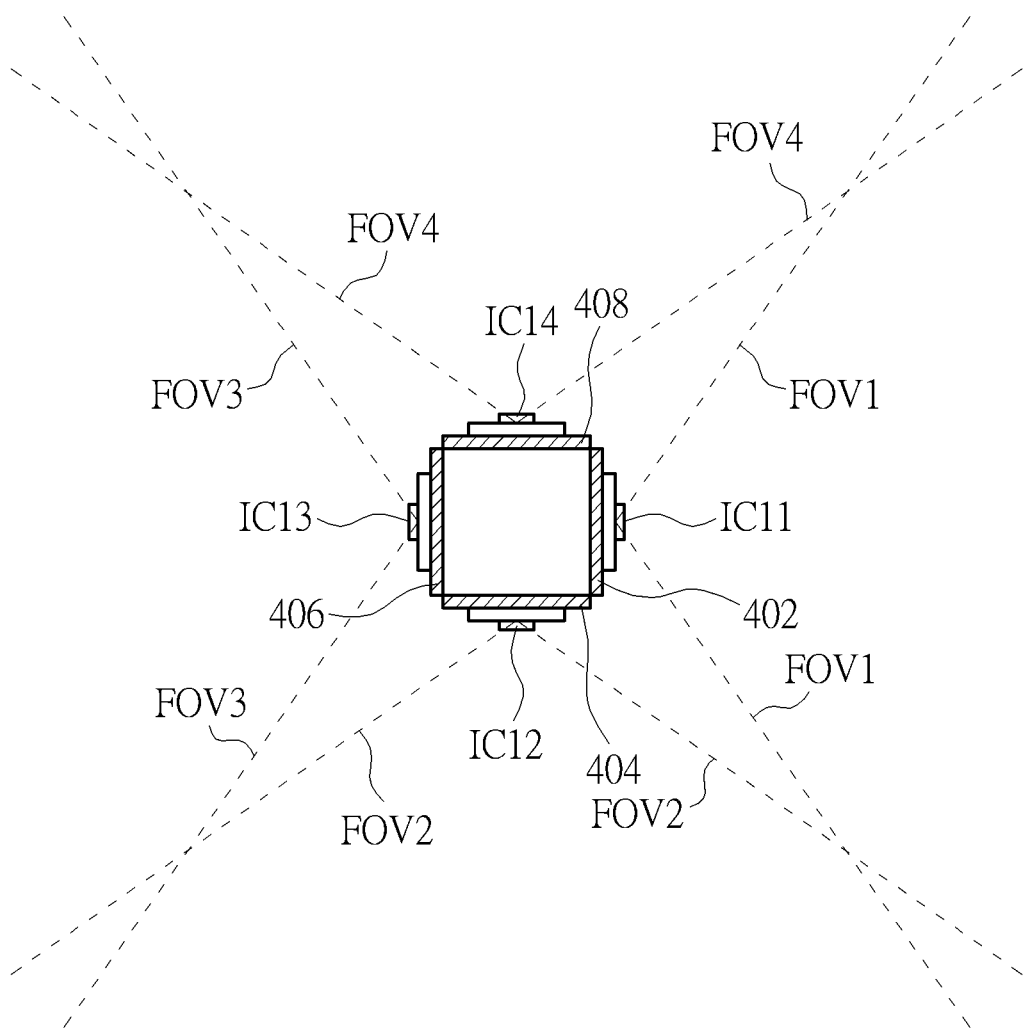
FIG. 5A is a diagram illustrating a top view of the image device.
Figure 5B:
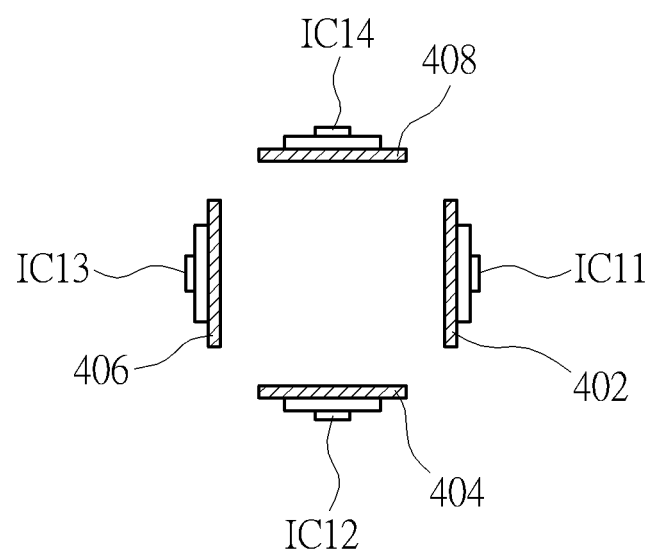
FIGS. 5B-5E are diagrams illustrating the image devices according to various embodiments of the present invention.
Figure 5C:
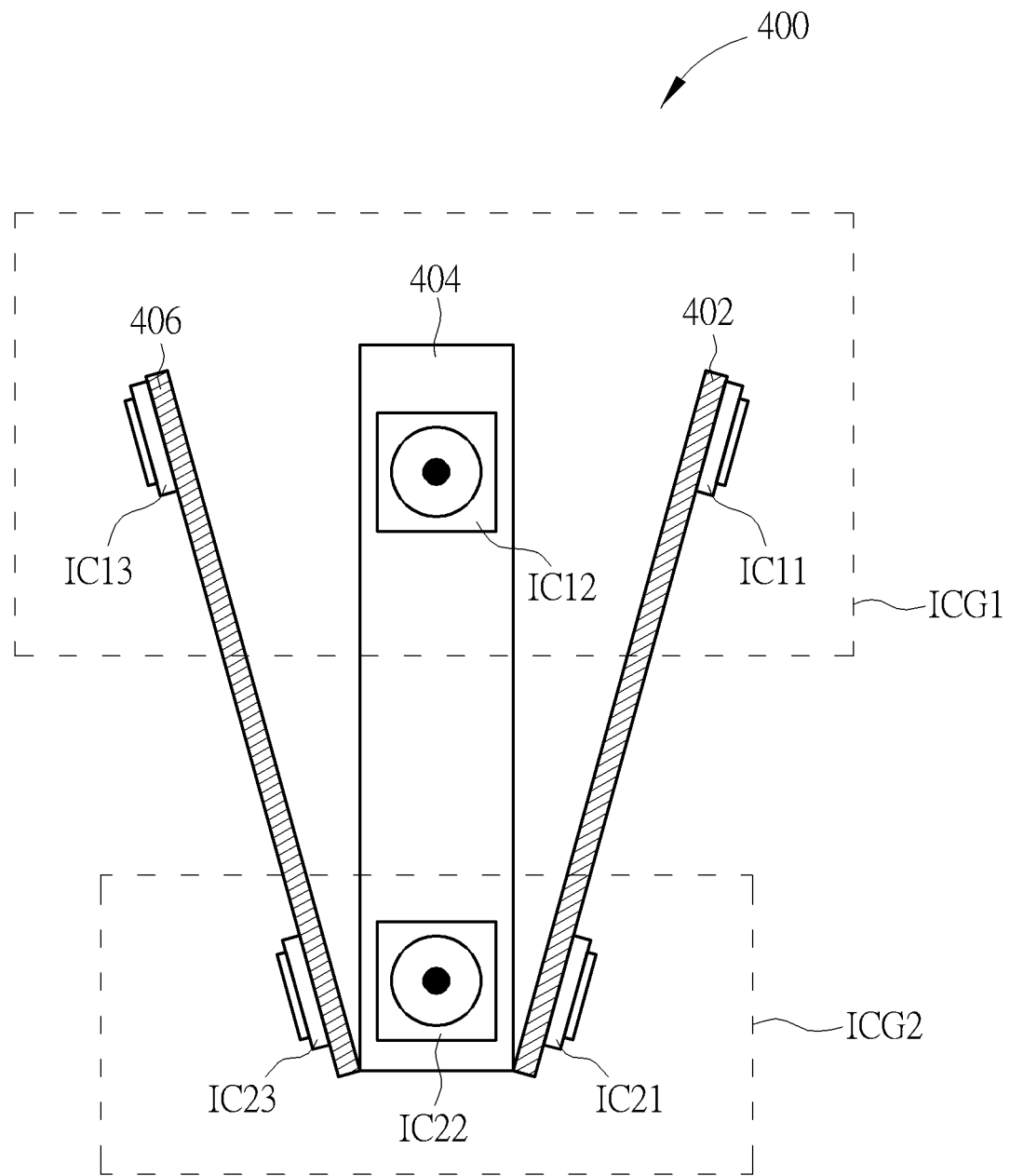
Figure 5D:
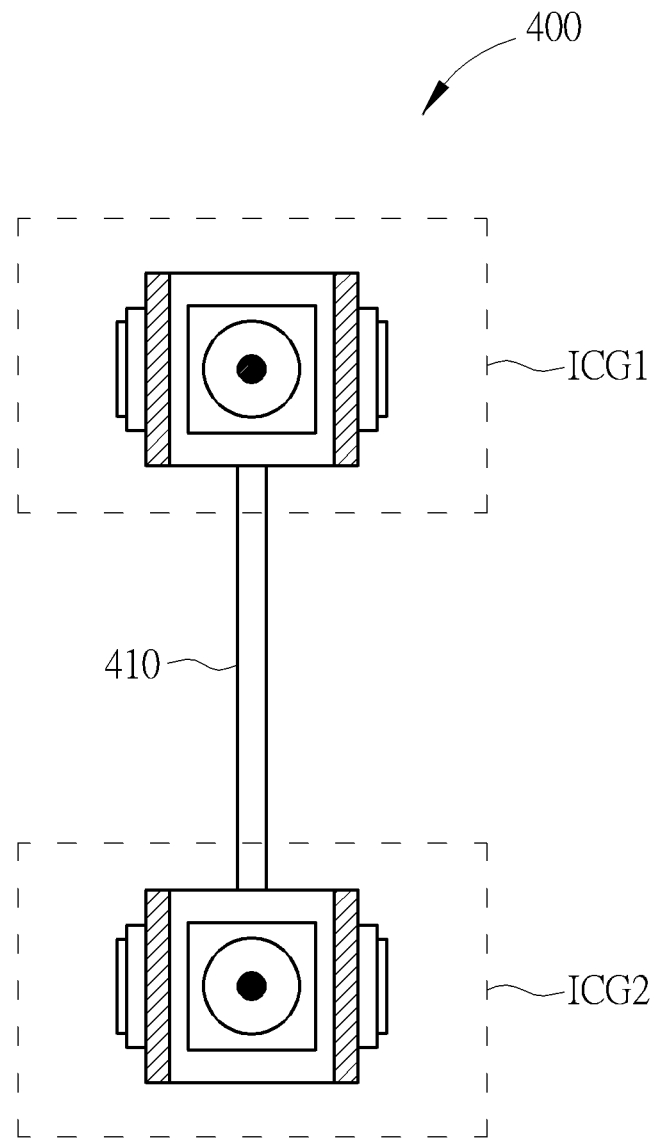
Figure 5E:
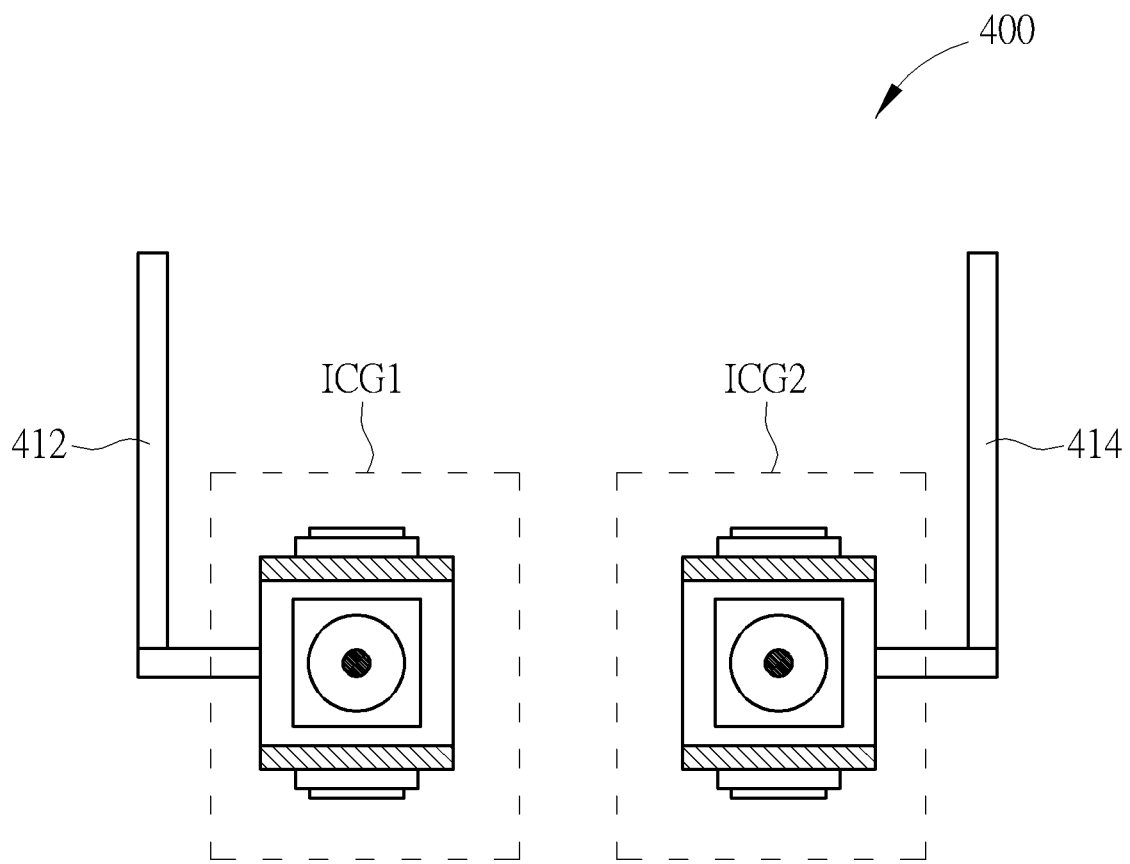

In an embodiment shown in FIG. 5A, atop view of the supporting units 402, 404, 406, 408 forms a closed convex quadrilateral, wherein FIG. 5A only shows the image capturers IC11-IC14 included in the image capturing group ICG1, and the supporting units 402, 404, 406, 408). However, in an embodiment shown in FIG. 5B, the image device 400 can make the supporting units 402, 404, 406, 408 not touch each other through a mechanism, the mechanism is not shown in FIG. 5B, and the mechanism is obvious to one of ordinary skill in the art. In addition, in an embodiment shown in FIG. 5C, one end of each of the supporting units 402, 404, 406, 408 and one end of each of two adjacent supporting units of the supporting units 402, 404, 406, 408 touch each other. However, in another embodiment of the present invention, the image device 400 can also not include the supporting units 402, 404, 406, 408, and utilize at least one supporting unit 410 shown in FIG. 5D to make the image capturing group ICG1 be connected to the image capturing group ICG2. Or, as shown in FIG. 5E, the image capturing group ICG1 and the image capturing group ICG2 can also be fixed through at least two fixed units 412, 414. A sum of angles of visual fields of all image capturers included in each image capturing group of the above-mentioned image capturing groups is greater than 360 degree. For example, as shown in FIG. 5A, a sum of angles of visual fields FOV1, FOV2, FOV3, FOV4 of the image capturers IC11-IC14 is greater than 360 degree.

Figure 6:
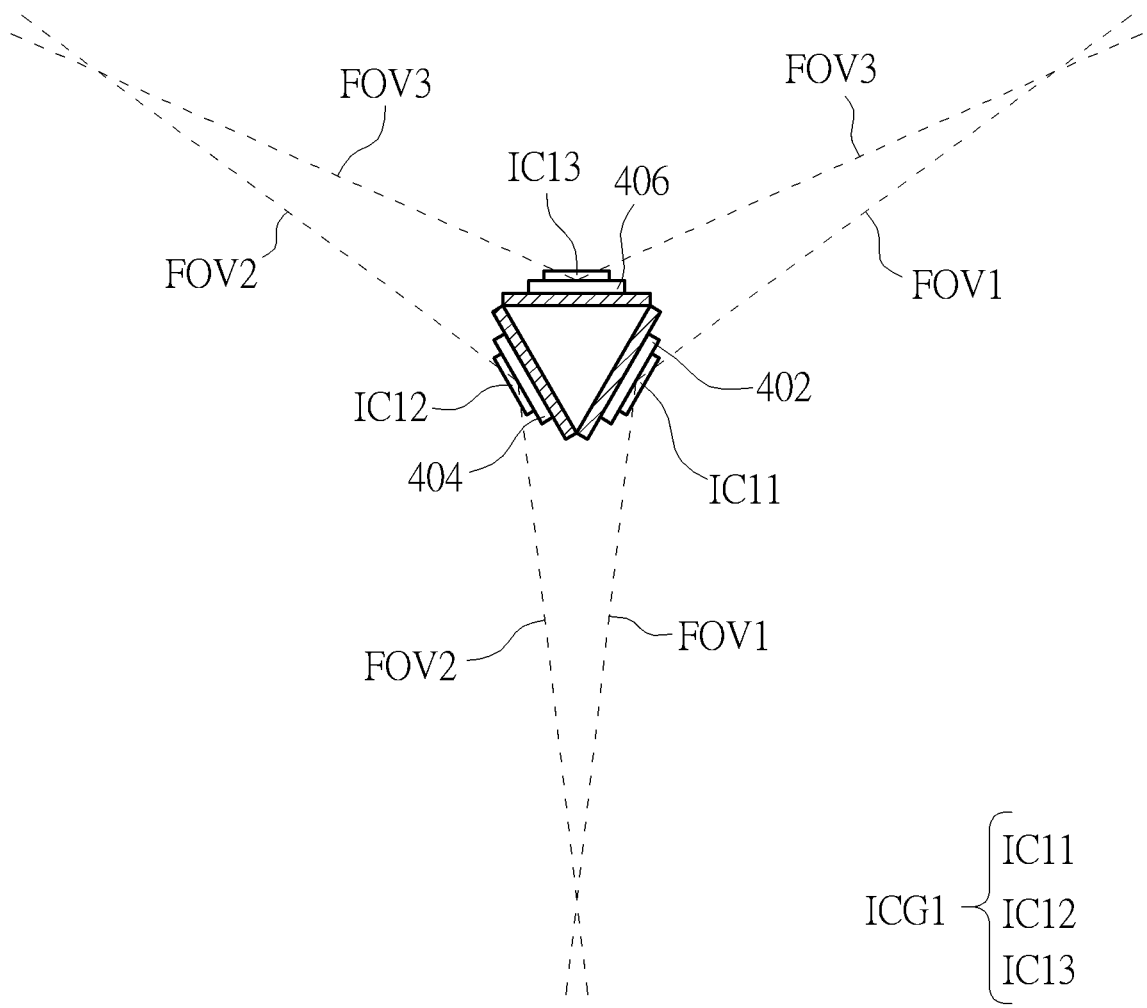
FIG. 6 is a diagram illustrating a top view of the image device according to another embodiment of the present invention.

In addition, FIG. 6 is a diagram illustrating a top view of the image device 400 according to another embodiment of the present invention. In the embodiment of the present invention, the image device 400 can only include the supporting units 402, 404, 406, each image capturing group of the image capturing groups ICG1, ICG2 includes three image capturers, and a top view of the supporting units 402, 404, 406 forms a triangle. For simplifying FIG. 6, FIG. 6 only shows the image capturers IC11-IC13 included in the image capturing group ICG1, and the supporting units 402, 404, 406.

Figure 7:
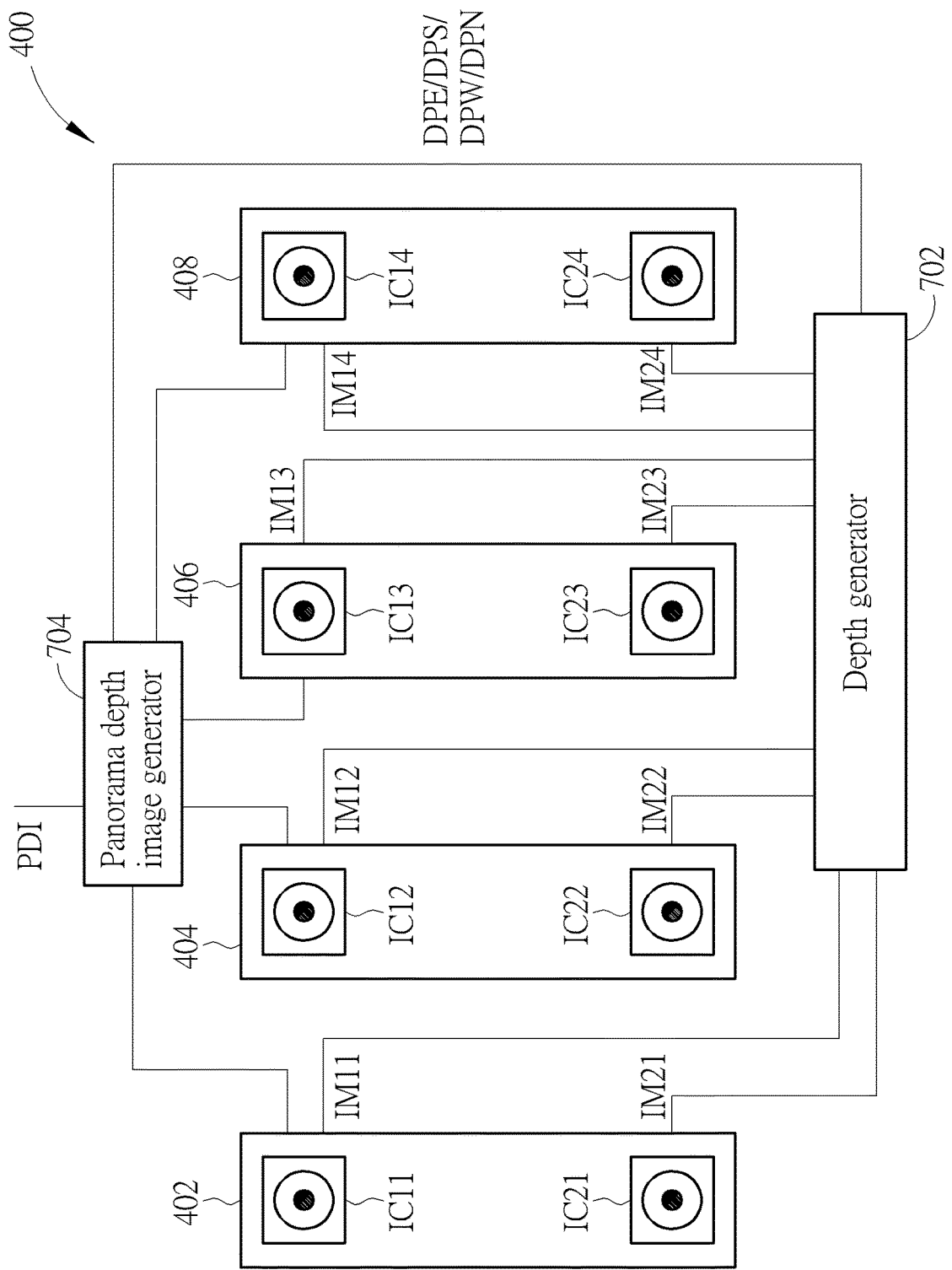
FIG. 7 is an exploded diagram of the image device.

Please refer to FIG. 7. FIG. 7 is an exploded diagram of the image device 400. As shown in FIG. 7, the image capturers IC11-IC14 included in the image capturing group ICG1 and the image capturer IC21-IC24 included in the image capturing group ICG2 are coupled to a depth generator 702 further included in the image device 400, and the image capturers IC11-IC14 included in the image capturing group ICG1 are further coupled to a panoramic depth image generator 704 further included in the image device 400. As shown in FIG. 7, the depth generator 702 can generate a depth map DPE facing the east (wherein a direction of the east can be referred to FIG. 4A) according to a first image IM11 captured by the image capturer IC11 and a second image IM21 captured by a corresponding image capturer (that is, the image capturer IC21) of the image capturing group ICG2; the depth generator 702 can generate a depth map DPS facing the south (wherein a direction of the south can be referred to FIG. 4A) according to a first image IM12 captured by the image capturer IC12 and a second image IM22 captured by a corresponding image capturer (that is, the image capturer IC22) of the image capturing group ICG2; the depth generator 702 can generate a depth map DPW facing the west (wherein a direction of the west can be referred to FIG. 4A) according to a first image IM13 captured by the image capturer IC13 and a second image IM23 captured by a corresponding image capturer (that is, the image capturer IC23) of the image capturing group ICG2; and the depth generator 702 can generate a depth map DPN facing the north (wherein a direction of the north can be referred to FIG. 4A) according to a first image IM14 captured by the image capturer IC14 and a second image IM24 captured by a corresponding image capturer (that is, the image capturer IC24) of the image capturing group ICG2.

Figure 8:
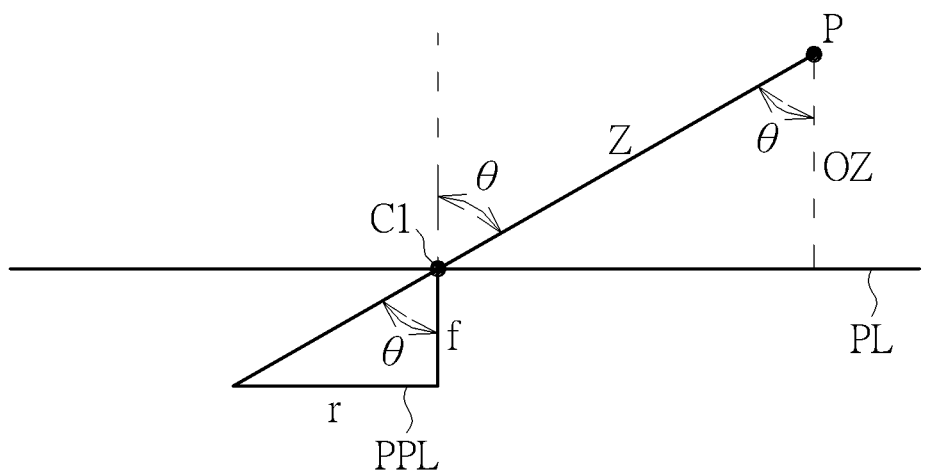
FIG. 8 is a diagram illustrating a relationship between an original depth and a converted depth.

In addition, depth information of the above-mentioned depth maps (the depth map DPE, the depth map DPS, the depth map DPW, the depth map DPN) can also have different representations through conversion. FIG. 8 is a diagram illustrating a relationship between original depth and converted depth. An original depth OZ (as shown in FIG. 8) of a point P of the depth map DPE corresponding to a plane PL where the optical center C1 of the image capturer IC11 is located can be converted into a converted depth Z through equation (1), wherein the converted depth Z is defined by taking the optical center C1 of the image capturer IC11 as an origin (that is, an origin corresponding to all converted depths of the depth map DPE is the optical center C1 of the image capturer IC11). In addition, as shown in FIG. 8, f is a focal length of the image capturer IC11, PPL is an imaging plane of the image capturer IC11, θ is an angle, and a distance r can be represented by pixel width of the image capturer IC11:

$$Z = \frac{OZ}{\cos\theta} = OZ \times \frac{\sqrt{f^2 + r^2}}{f} \quad (1)$$

In addition, it is obvious to one of ordinary skill in the art to calculate a relationship between the focal length f and the distance r through intrinsic parameters of the image capturer IC11, so further description thereof is omitted for simplicity. In addition, in another embodiment of the present invention, the original depth OZ (as shown in FIG. 8) of the point P of the depth map DPE corresponding to the plane PL can be converted into another converted depth, wherein the another converted depth is defined by taking any point or any line of a space where the image device 400 is located as an origin.

But, in another embodiment of the present invention, an origin corresponding to the all converted depths of the depth map DPE is the optical center C3 of the image capturer IC21. In addition, all original depths of the depth maps DPS, DPW, DPN can be converted through the above-mentioned principle, so further description thereof is omitted for simplicity. In addition, after all original depths of the depth maps DPE, DPS, DPW, DPN are converted into converted depths through the above-mentioned principle, all converted depths of the depth maps DPE, DPS, DPW, DPN can be applied to a panoramic depth image PDI generated by the panoramic depth image generator 704. That is, the panoramic depth image PDI is generated by a panoramic image generated by the panoramic depth image generator 704 according to the first images IM11-IM14 and the all converted depths of the depth maps DPE, DPS, DPW, DPN, wherein the panoramic depth image PDI can be a gray-level panoramic depth image or a color panoramic depth image. In addition, in another embodiment of the present invention, a panoramic image generator can receive the depth maps DPE, DPS, DPW, DPN, and generate the first image IM11 and the second image IM21 corresponding to the depth map DPE, the first image IM12 and the second image IM22 corresponding to the depth map DPS, the first image IM13 and the second image IM23 corresponding to the depth map DPW, and the first image IM14 and the second image IM24 corresponding to the depth map DPN according to the depth maps DPE, DPS, DPW, DPN, wherein a sum of view angles corresponding to the depth maps DPE, DPS, DPW, DPN is equal to 360 degree. Then, the panoramic image generator can generate the panoramic image according to the first images IM11-IM14, or generate another panoramic image according to the second images IM21-IM24.

Because the panoramic depth image PDI is generated by the panoramic image generated by the panoramic depth image generator 704 according to the first images IM11-IM14 and the all converted depths of the depth maps DPE, DPS, DPW, DPN, the panoramic depth image PDI has color information of the panoramic image generated by the panoramic depth image generator 704 according to the first images IM11-IM14 and information of the all converted depths of the depth maps DPE, DPS, DPW, DPN. As shown in FIG. 4A, because the distance D1 between the optical center C1 of the image capturer IC11 and the optical center C2 of the image capturer IC12 is much less than the distance D2 between the optical center C1 of the image capturer IC11 and the optical center C3 of the image capturer IC2*l*, the panoramic depth image PDI generated by the image device 400 can solve mechanism contradiction generated by the prior art. In addition, the depth generator 702 can be a field programmable gate array (FPGA) with the above-mentioned functions of the depth generator 702, or an application-specific integrated circuit (ASIC) with the above-mentioned functions of the depth generator 702, or a software module with the above-mentioned functions of the depth generator 702. In addition, the panoramic depth image generator 704 can be a field programmable gate array with the above-mentioned functions of the panoramic depth image generator 704, or an application-specific integrated circuit with the above-mentioned functions of the panoramic depth image generator 704, or a software module with the above-mentioned functions of the panoramic depth image generator 704.

Figure 9:
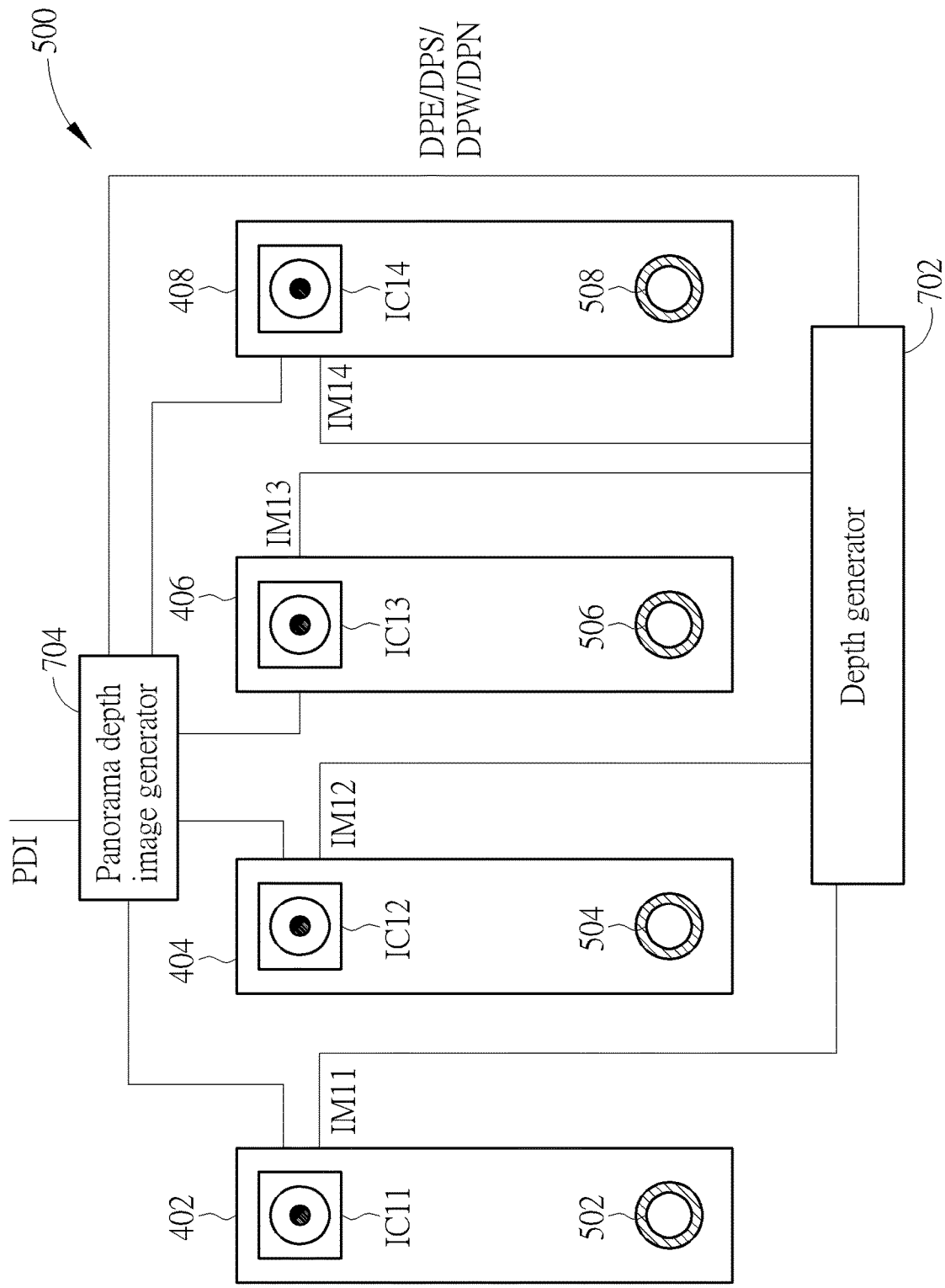
FIG. 9 is an exploded diagram of an image device according to a second embodiment of the present invention.

Please refer to FIG. 9. FIG. 9 is an exploded diagram of an image device 500 according to a second embodiment of the present invention. As shown in FIG. 9, a difference between the image device 500 and the image device 400 is that the image device 500 utilizes structured light generation units 502-508 to substitute for the image capturer IC21-IC24. In addition, subsequent operational principles of the image device 500 are the same as those of the image device 400, so further description thereof is omitted for simplicity.

Figure 10:
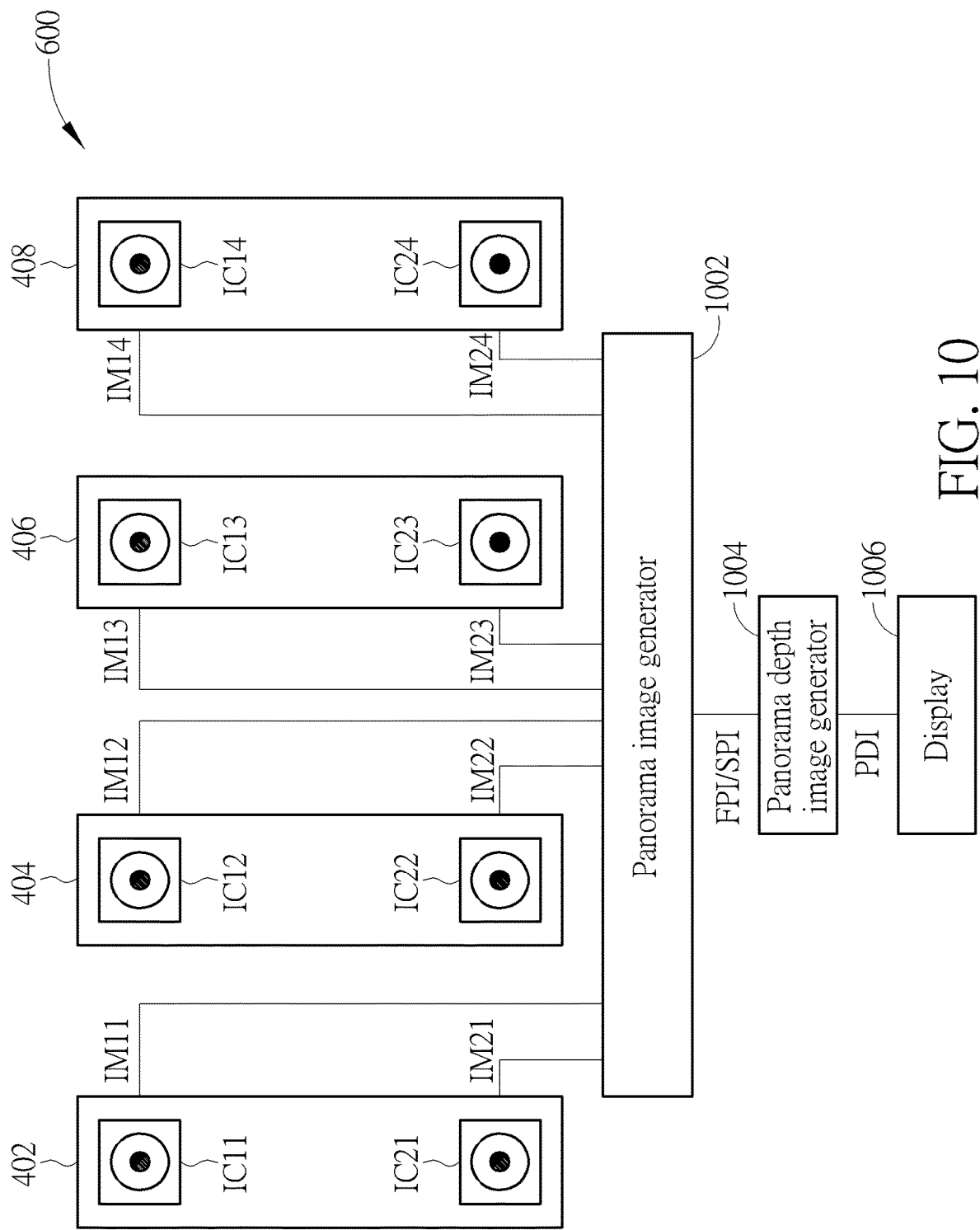
FIG. 10 is an exploded diagram of an image device according to a third embodiment of the present invention.
Figure 11:
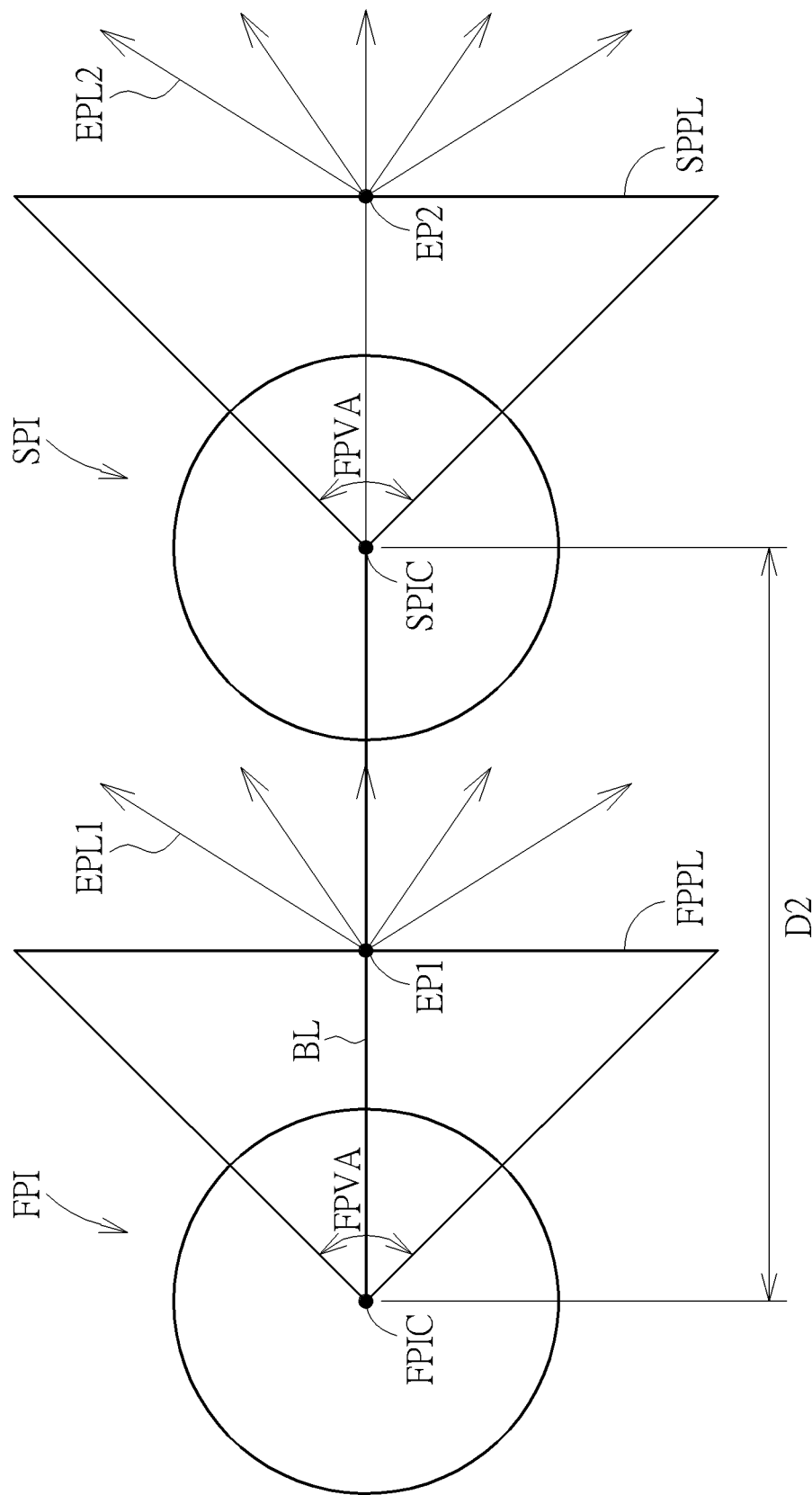
FIG. 11 is a diagram illustrating a first predetermined view angle, a first imaging plane, a second imaging plane, a first epipole, a second epipole, an optical center of a first panoramic image, and an optical center of a second panoramic image.
Figure 12:
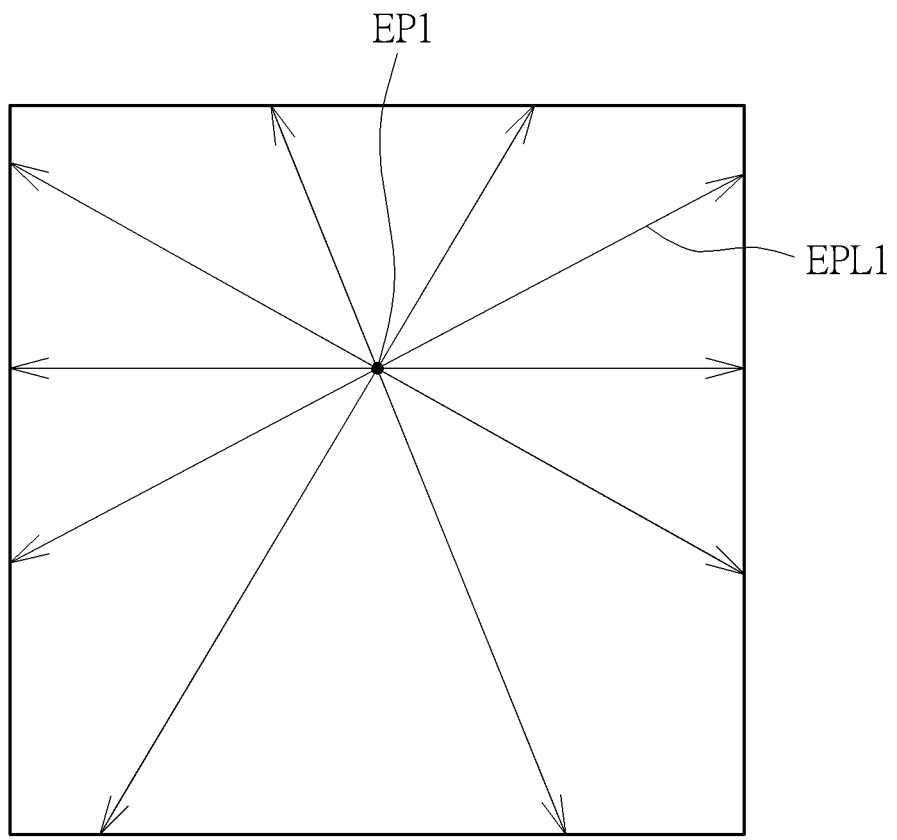
FIG. 12 is a diagram illustrating first epipolar lines corresponding to the first epipole.

Please refer to FIG. 10. FIG. 10 is an exploded diagram of an image device 600 according to a third embodiment of the present invention. As shown in FIG. 10, the image capturers IC11-IC14 included in the image capturing group ICG1 and the image capturer IC21-IC24 included in the image capturing group ICG2 are coupled to a panoramic image generator 1002 further included in the image device 600, a panoramic depth image generator 1004 further included in the image device 600 is coupled to the panoramic image generator 1002, and a display 1006 further included in the image device 600 is coupled to the panoramic depth image generator 1004, wherein the display 1006 is used for displaying the panoramic depth image PDI. As shown in FIG. 10, the panoramic image generator 1002 can generate a first panoramic image FPI according to the first image IM11 captured by the image capturer IC11, the first image IM12 captured by the image capturer IC12, the first image IM13 captured by the image capturer IC13, and the first image IM14 captured by the image capturer IC14, and the panoramic image generator 1002 can generate a second panoramic image SPI according to the second image IM21 captured by the image capturer IC21, the second image IM22 captured by the image capturer IC22, the second image IM23 captured by the image capturer IC23, and the second image IM24 captured by the image capturer IC24, wherein as shown in FIG. 11, a distance D2 exists between an optical center FPIC of the first panoramic image FPI and an optical center SPIC of the second panoramic image SPI, and the optical center FPIC and the optical center SPIC are located at a base line BL. After the panoramic depth image generator 1004 receives the first panoramic image FPI and the second panoramic image SPI, the panoramic depth image generator 1004 can divide 360 degree view angle corresponding to a plane where the optical center FPIC is located into 4 predetermined view angles, wherein an angle of each predetermined view angle of the 4 predetermined view angles is equal to 90 degree. But, the present invention is not limited to the panoramic depth image generator 1004 dividing the 360 degree view angle corresponding to the plane where the optical center FPIC is located into the 4 predetermined view angles, that is, the panoramic depth image generator 1004 can divide 360 degree view angle into a plurality of predetermined view angles. In addition, angles of the plurality of predetermined view angles can be identical or different. After the panoramic depth image generator 1004 divides the 360 degree view angle into the 4 predetermined view angles, the panoramic depth image generator 1004 can project the first panoramic image FPI and the second panoramic image SPI on a first imaging plane FPPL and a second imaging plane SPPL to generate a first projection image and a second projection image according to a first predetermined view angle FPVA (as shown in FIG. 11) of the 4 predetermined view angles respectively, wherein the first imaging plane FPPL and the second imaging plane SPPL are parallel to an imaging plane (not shown in FIG. 11) of the display 1006. After the first projection image and the second projection image are generated, the panoramic depth image generator 1004 can calculate a first epipole EP1 corresponding to the first predetermined view angle FPVA according to the first predetermined view angle FPVA and the optical center FPIC, and calculate a second epipole EP2 corresponding to the first predetermined view angle FPVA according to the first predetermined view angle FPVA and the optical center SPIC. After the panoramic depth image generator 1004 calculates the first epipole EP1 and the second epipole EP2, the panoramic depth image generator 1004 can determine a search direction of the panoramic depth image generator 1004 in the first projection image and the second projection image according to a first epipolar line EPL1 (also corresponding to the first predetermined view angle FPVA) of the first epipole EP1 and a corresponding second epipolar line EPL2 (also corresponding to the first predetermined view angle FPVA) of the second epipole EP2, wherein a pattern of the first epipolar line EPL1 of the first epipole EP1 can be referred to FIG. 12. As shown in FIG. 12, the first epipolar line EPL1 is scattered outward, wherein the first epipolar line EPL1 is centered on the first epipole EP1. In addition, a pattern of the second epipolar line EPL2 of the second epipole EP2 can also be referred to FIG. 12, so further description thereof is omitted for simplicity. Thus, the panoramic depth image generator 1004 can generate a depth map DPF corresponding to the first predetermined view angle FPVA according to the first projection image and the second projection image. In addition, it is obvious to one of ordinary skill in the art that the panoramic depth image generator 1004 calculates the first epipole EP1, the second epipole EP2, the first epipolar line EPL1, and the second epipolar line EPL2, so further description thereof is also omitted for simplicity.

Figure 13:
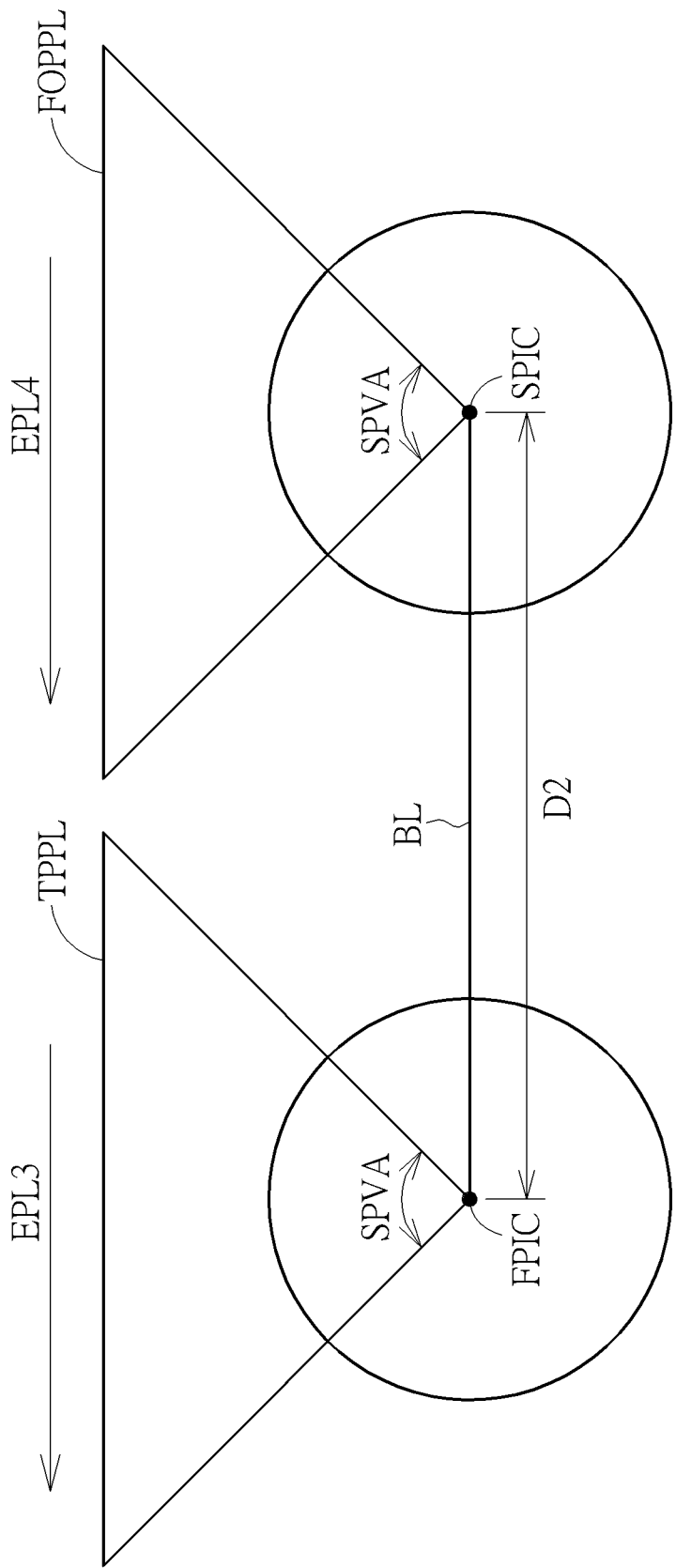
FIG. 13 is a diagram illustrating a second predetermined view angle, a third imaging plane, a fourth imaging plane, a third epipole, a fourth epipole, the optical center of the first panoramic image, and the optical center of the second panoramic image.

As shown in FIG. 13, the panoramic depth image generator 1004 can project the first panoramic image FPI and the second panoramic image SPI on a third imaging plane TPPL and a fourth imaging plane FOPPL to generate a third projection image and a fourth projection image respectively according to a second predetermined view angle SPVA of the 4 predetermined view angles, wherein the third imaging plane TPPL and the fourth imaging plane FOPPL are parallel to the imaging plane (not shown in FIG. 13) of the display 1006. After the third projection image and the fourth projection image are generated, the panoramic depth image generator 1004 can calculate a third epipole (located at infinity) corresponding to the second predetermined view angle SPVA according to the second predetermined view angle SPVA and the optical center FPIC, and calculate a fourth epipole (located at infinity) corresponding to the second predetermined view angle SPVA according to the second predetermined view angle SPVA and the optical center SPIC. After the panoramic depth image generator 1004 calculates the third epipole and the fourth epipole, the panoramic depth image generator 1004 can determine a search direction of the panoramic depth image generator 1004 in the third projection image and the fourth projection image according to a third epipolar line EPL3 (also corresponding to the second predetermined view angle SPVA) of the third epipole and a corresponding fourth epipolar line EPL4 (also corresponding to the second predetermined view angle SPVA) of the fourth epipole, wherein the third epipolar line EPL3 and the fourth epipolar line EPL4 are parallel to each other. Thus, the panoramic depth image generator 1004 can generate a depth map DPS corresponding to the second predetermined view angle SPVA according to the third projection image and the fourth projection image.

In addition, a depth map DPT corresponding to a third predetermined view angle of the 4 predetermined view angles, a depth map DPFO corresponding to a fourth predetermined view angle of the 4 predetermined view angles, a depth map DPFI corresponding to a fifth predetermined view angle of a top of the image device 600, and a depth map DPSI corresponding to a sixth predetermined view angle of a bottom of the image device 600 can be generated by the above-mentioned way for generating the depth map DPS corresponding to the second predetermined view angle SPVA or the depth map DPF corresponding to the first predetermined view angle FPVA, wherein all original depths of the depth maps DPF, DPS, DPT, DPFO, DPFI, DPSI can be converted into converted depths through the above-mentioned principle shown in FIG. 8, so further description thereof is omitted for simplicity. After the panoramic depth image generator 1004 converts the all original depths of the depth maps DPF, DPS, DPT, DPFO, DPFI, DPSI into the converted depths, the panoramic depth image generator 1004 can generate the panoramic depth image PDI corresponding to the first panoramic image FPI according to all converted depths of the depth maps DPF, DPS, DPT, DPFO, DPFI, DPSI and the first panoramic image FPI, or generate the panoramic depth image PDI corresponding to the second panoramic image SPI according to the all converted depths of the depth maps DPF, DPS, DPT, DPFO, DPFI, DPSI and the second panoramic image SPI. In addition, subsequent operational principles of the image device 600 are the same as those of the image device 400, so further description thereof is omitted for simplicity.

In addition, the panoramic depth image generator 1004 can be a field programmable gate array with the above-mentioned functions of the panoramic depth image generator 1004, or an application-specific integrated circuit with the above-mentioned functions of the panoramic depth image generator 1004, or a software module with the above-mentioned functions of the panoramic depth image generator 1004.

In addition, in another embodiment of the present invention, a depth image generator can be used for receiving a first panoramic image and a second panoramic image (corresponding to the first panoramic image), divide the first panoramic image and the second panoramic image into a plurality of first divided images and a plurality of second divided images according to a plurality of view angles respectively, utilize the method shown in FIGS. 11-13 to project each first divided image of the plurality of first divided images and a corresponding second divided image on a corresponding projection plane to generate a first projection image and a second projection image, and generate a depth map corresponding to the each first divided image according to the first projection image and the second projection image, wherein a sum of the plurality of view angles is not less than 360 degree. Therefore, the depth image generator can generate a plurality of depth maps corresponding to the plurality of view angles according to the first panoramic image and the second panoramic image.

In addition, in another embodiment of the present invention, an image generator can be used for receiving the panoramic depth image PDI, dividing the panoramic depth image PDI into a plurality of divided images according to the plurality of view angles, utilizing the method shown in FIGS. 11-13 to project each divided image of the plurality of divided images on a corresponding projection plane to generate a projection image corresponding to the each divided image, and converting each depth value of the projection image into a converted depth value, wherein the each divided image corresponding to a view angle of the plurality of view angles, the view angle corresponds to an optical center plane (can be referred to the plane PL shown in FIG. 8), the each depth value (can be referred to the original depth OZ shown in FIG. 8) corresponding to an optical center plane (can be referred to the plane PL shown in FIG. 8), the corresponding projection plane is parallel to the optical center plane, and the sum of the plurality of view angles is not less than 360 degree. Therefore, after the image generator converts the each depth value (can be referred to the original depth OZ shown in FIG. 8) of the projection image into the converted depth value (can be referred to the converted depth Z shown in FIG. 8), the converted depth value corresponds to the optical center or baseline (can be referred to the optical center C1 or a baseline where the optical center C1 is located shown in FIG. 8).

Figure 14A:
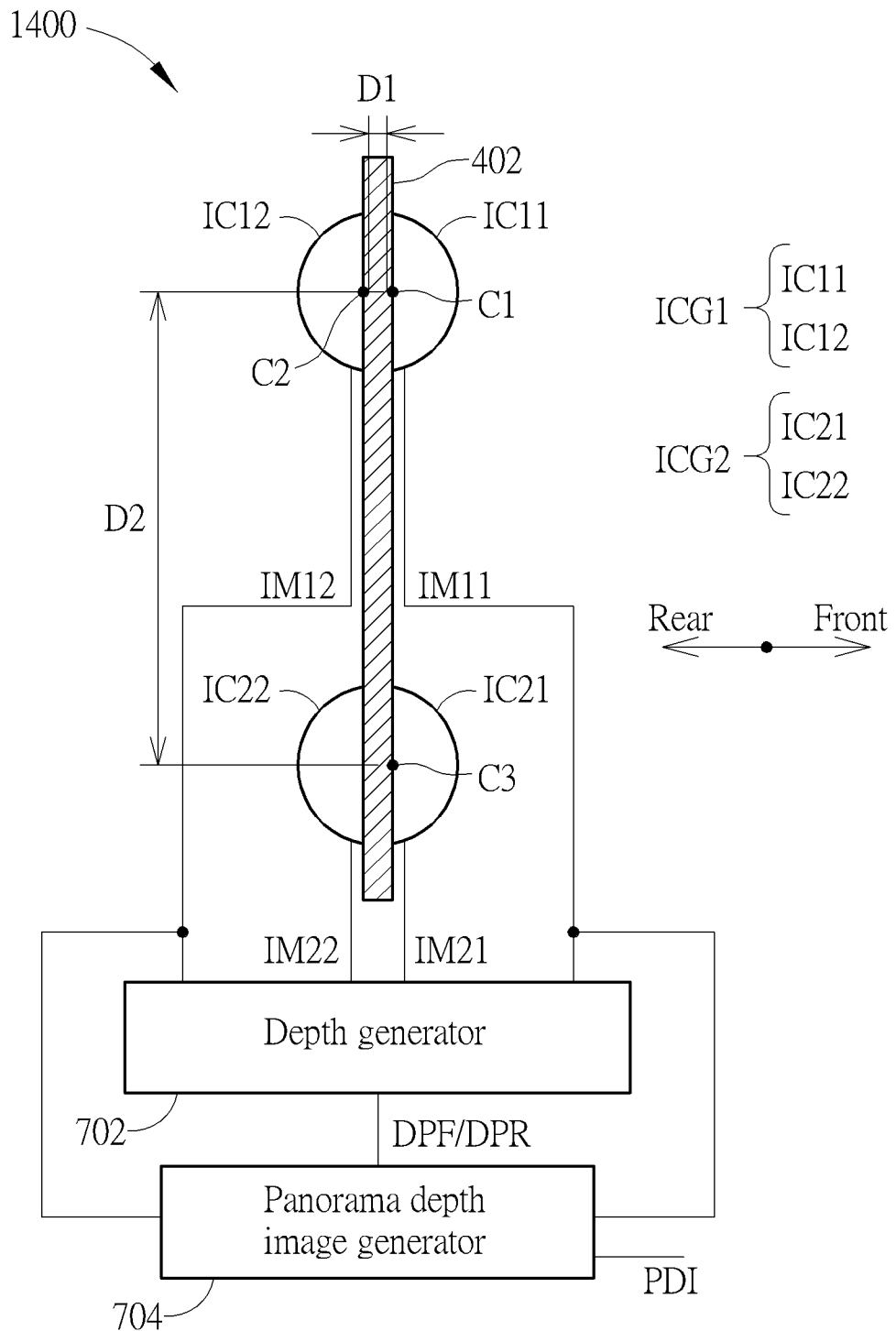
FIG. 14A is a diagram illustrating a side view of an image device for generating panoramic depth images according to a fourth embodiment of the present invention.
Figure 15:
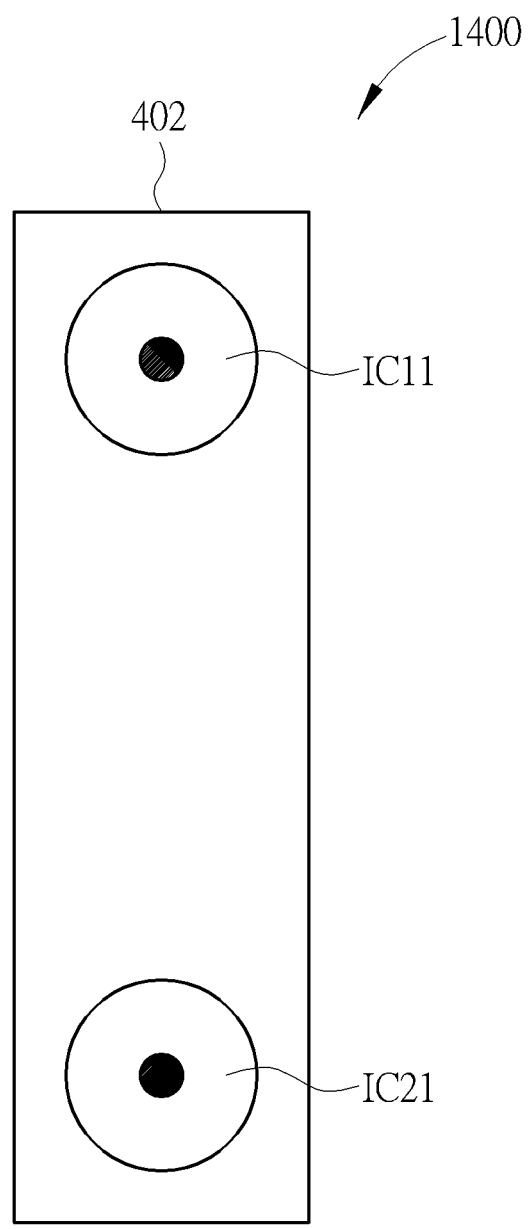
FIG. 15 is a diagram illustrating a front view of the image device.

In addition, please refer to FIGS. 14A, 15. FIG. 14A is a diagram illustrating a side view of an image device 1400 for generating panoramic depth images according to a fourth embodiment of the present invention, and FIG. 15 is a diagram illustrating a front view of the image device 1400, wherein the image device 1400 includes two image capturing groups ICG1, ICG2, a supporting unit 402, a depth generator 702, and a panoramic depth image generator 704, each image capturing group of the image capturing groups ICG1, ICG2 includes two image capturers, and each image capturer of the two image capturers is a fisheye image capturer. As shown in FIG. 14A, the image capturing group ICG1 includes image capturers IC11, IC12, and the image capturing group ICG2 includes image capturers IC21, IC22. But, the present invention is not limited to the image device 1400 only including the image capturing groups ICG1, ICG2 and the supporting unit 402, and each image capturing group image capturing groups ICG1, ICG2 including two image capturers. As shown in FIG. 14A, the image capturers IC11, IC21 are installed on one side of the supporting unit 402, and the image capturers IC12, IC22 are installed on the other side of the supporting unit 402. In addition, FIG. 15 only shows the image capturer IC11 of the image capturing group ICG1 and the image capturer IC21 of the image capturing group ICG2.

As shown in FIG. 14A, the depth generator 702 can generate a depth map DPF facing the front (wherein a direction of the front can be referred to FIG. 14A) according to the first image IM11 captured by the image capturer IC11 and the second image IM21 captured by a corresponding image capturer (that is, the image capturer IC21) of the image capturing group ICG2; and the depth generator 702 can generate a depth map DPR facing the rear (wherein a direction of the rear can be referred to FIG. 14A) according to the first image IM12 captured by the image capturer IC12 and the second image IM22 captured by a corresponding image capturer (that is, the image capturer IC22) of the image capturing group ICG2, wherein all original depths of the depth maps DPF, DPR can be converted into converted depths through the above-mentioned principle shown in FIG. 8, so further description thereof is omitted for simplicity.

In addition, after the all original depths of the depth maps DPF, DPR are converted into the converted depths through the above-mentioned principle shown in FIG. 8, all converted depths of the depth maps DPF, DPR can be applied to the panoramic depth image PDI generated by the panoramic depth image generator 704. That is, the panoramic depth image PDI is generated by a panoramic image generated by the panoramic depth image generator 704 according to the first images IM11, IM12 and the all converted depths of the depth maps DPF, DPR. In addition, as shown in FIG. 14A, because the distance D1 between the optical center C1 of the image capturer IC11 and the optical center C2 of the image capturer IC12 is much less than the distance D2 between the optical center C1 of the image capturer IC11 and the optical center C3 of the image capturer IC21, the panoramic depth image PDI generated by the image device 1400 can solve the mechanism contradiction generated by the prior art.

Figure 14B:
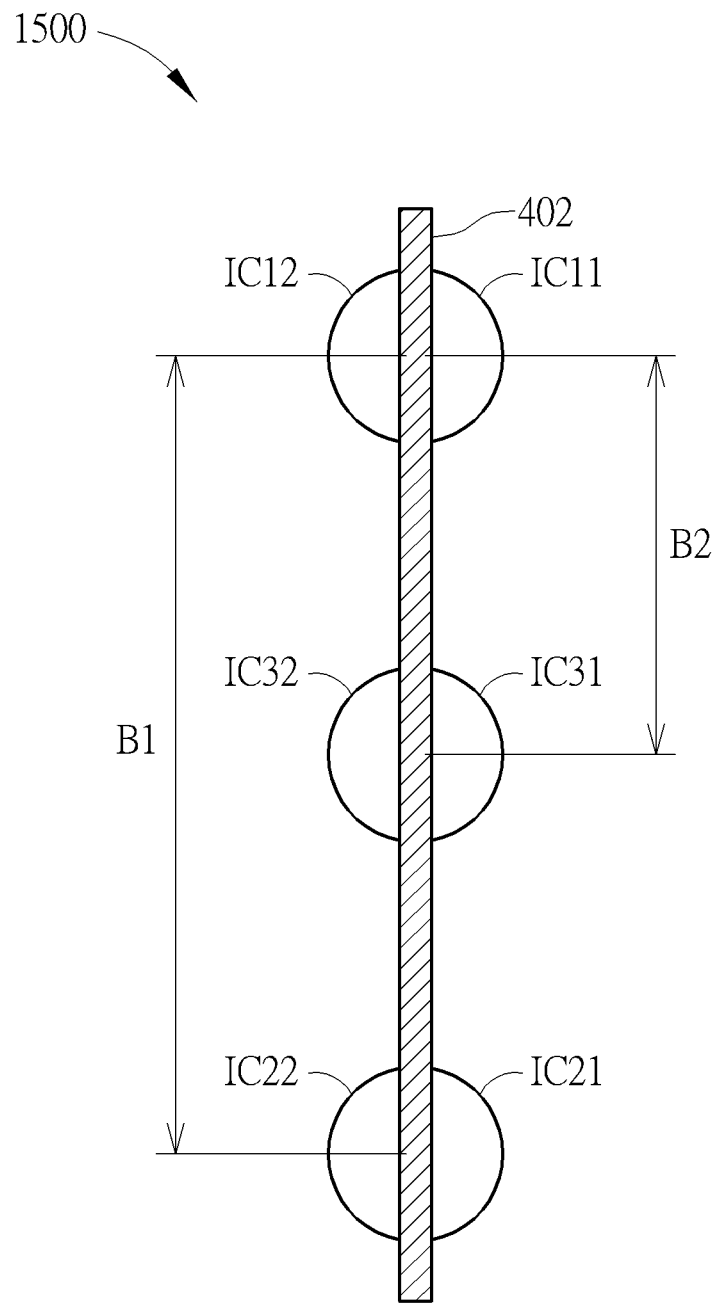
FIGS. 14B-14D are diagrams illustrating a side view of an image device for generating panoramic depth images according to other embodiments of the present invention.

In addition, in another embodiment of the present invention, as shown in FIG. 14B, a difference between an image device 1500 for generating panoramic depth images and the image device 1400 is that the image device 1500 includes three image capturing groups ICG1, ICG2, ICG3, wherein for simplifying FIG. 14B, FIG. 14B does not show the depth generator 702 and the panoramic depth image generator 704. But, in another embodiment of the present invention, the image device 1500 can include at least three image capturing groups. As shown in FIG. 14B, each image capturing group of the image capturing groups ICG1, ICG2, ICG3 includes two image capturers, and each image capturer of the two image capturers is a fisheye image capturer. As shown in FIG. 14B, the image capturing group ICG1 includes the image capturers IC11, IC12, the image capturing group ICG2 includes the image capturers IC21, IC22, and the image capturing group ICG3 includes image capturers IC31, IC32. As shown in FIG. 14B, the image capturers IC11, IC21, IC31 are installed on one side of the supporting unit 402, and the image capturers IC12, IC22, IC32 are installed on the other side of the supporting unit 402, wherein a first baseline B1 exists between the image capturers IC11, IC21 and a second baseline B2 exists between the image capturers IC11, IC31.

As shown in FIG. 14B, the depth generator 702 can generate a first depth map facing the front (wherein the direction of the front can be referred to FIG. 14A) according to the first image IM11 captured by the image capturer IC11 and the second image IM21 captured by a corresponding image capturer (that is, the image capturer IC21) of the image capturing group ICG2; similarly, the depth generator 702 can also generate a second depth map facing the front according to the first image IM11 captured by the image capturer IC11 and a third image captured by a corresponding image capturer (that is, the image capturer IC31) of the image capturing group ICG3. The depth generator 702 can generate a third depth map facing the rear (wherein the direction of the rear can be referred to FIG. 14A) according to the first image IM12 captured by the image capturer IC12 and the second image IM22 captured by a corresponding image capturer (that is, image capturer IC22) of the image capturing group ICG2; similarly, the depth generator 702 can generate a fourth depth map facing the rear according to the first image IM12 captured by the image capturer IC12 and a fourth image IM22 captured by a corresponding image capturer (that is, the image capturer IC32) of the image capturing group ICG3. Then, the panoramic depth image generator 704 can generate the panoramic depth image PDI according to the first depth map, the second depth map, the third depth map, and the fourth depth map. In addition, subsequent operational principles of the image device 1500 are the same as those of the image device 1400, so further description thereof is omitted for simplicity. In addition, an operational principle of the image device 1500 can also be applied to the image device 400, so further description thereof is also omitted for simplicity.

Figure 14C:
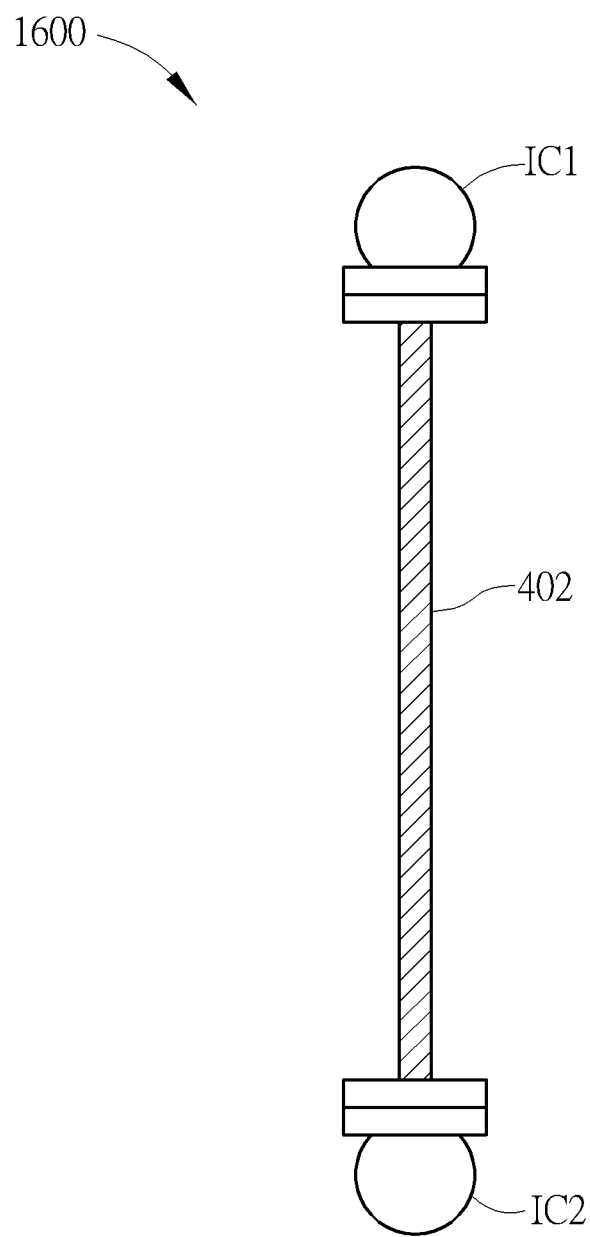

In addition, in another embodiment of the present invention, as shown in FIG. 14C, a difference between an image device 1600 for generating panoramic depth images and the image device 1400 is that the image device 1600 includes a first image capturer IC1 and a second image capturer IC2, wherein for simplifying FIG. 14C, FIG. 14C does not show the depth generator 702 and the panoramic depth image generator 704. In addition, as shown in FIG. 14C, a view angle of first image capturer IC1 and a view angle of the second image capturer IC2 need to be overlapped. For example, the view angle of first image capturer IC1 is greater than 180 degree and the view angle of the second image capturer IC2 is also greater than 180 degree. In addition, subsequent operational principles of the image device 1600 are the same as those of the image device 1400, so further description thereof is omitted for simplicity.

Figure 14D:
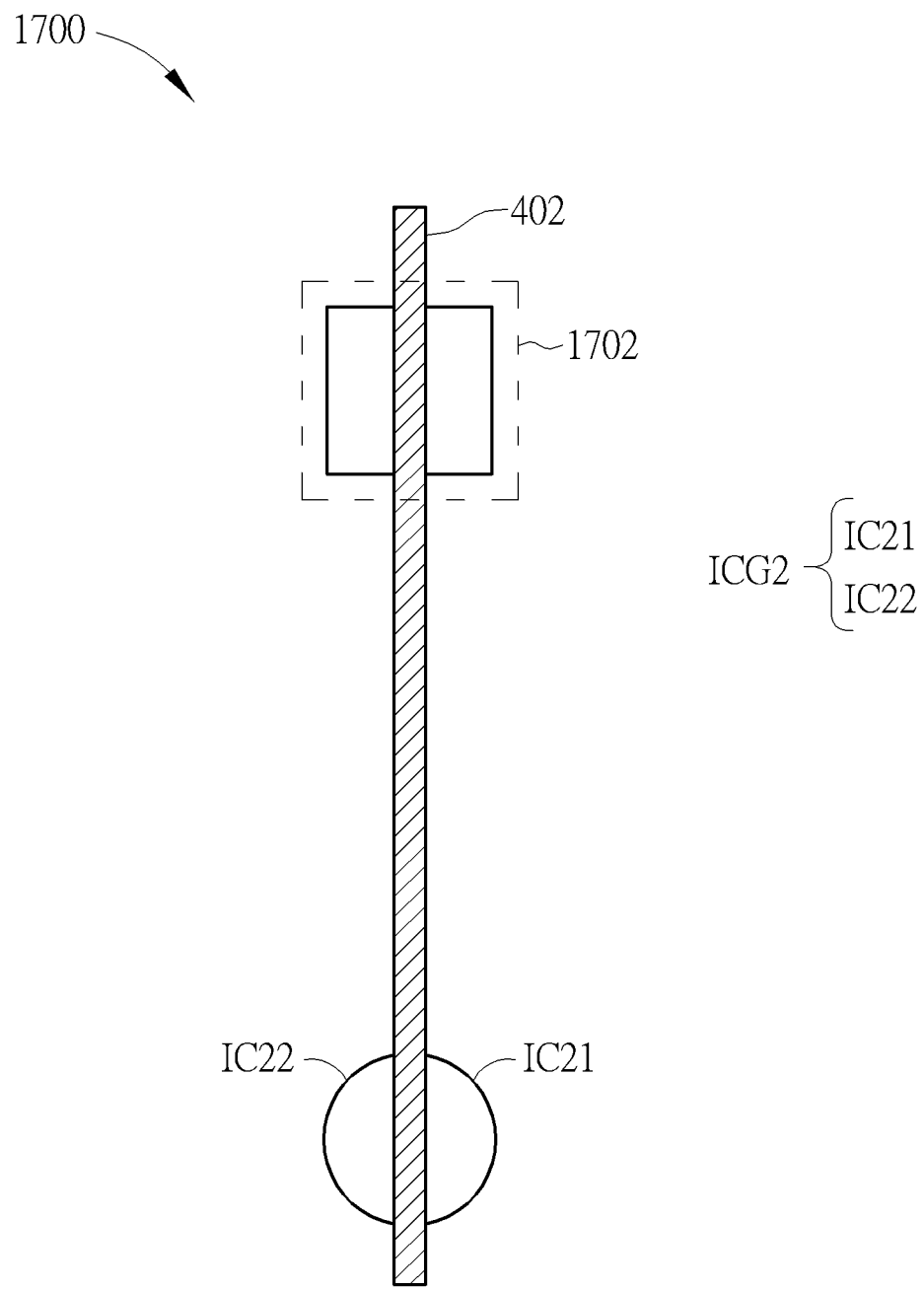

In addition, in another embodiment of the present invention, as shown in FIG. 14D, a difference between an image device 1700 for generating panoramic depth images and the image device 1400 is that the image device 1700 utilizes a light source group 1702 to substitute for the image capturing group ICG1 (or substitute for the image capturing group ICG2), wherein for simplifying FIG. 14D, FIG. 14D does not show the depth generator 702 and the panoramic depth image generator 704, and the light source group 1702 is used for emitting structured light. But, in another embodiment of the present invention, the image device 1700 can include at least one light source group and at least one image capturing group. In addition, in another embodiment of the present invention, the image capturing group ICG2 shown in FIG. 14D can be replaced with the first image capturer IC1 shown in FIG. 14C. As shown in FIG. 14D, the depth generator 702 can generate the depth map DPF facing the front (wherein the direction of the front can be referred to FIG. 14A) according to the first image IM21 including the structured light captured by the image capturer IC21; and the depth generator 702 can generate the depth map DPR facing the rear (wherein the direction of the rear can be referred to FIG. 14A) according to the second image IM22 including the structured light captured by the image capturer IC22. In addition, subsequent operational principles of the image device 1700 are the same as those of the image device 1400, so further description thereof is omitted for simplicity. In addition, the light source group 1702 of the image device 1700 can also be applied to the image device 400, so further description thereof is also omitted for simplicity.

Figure 14E:
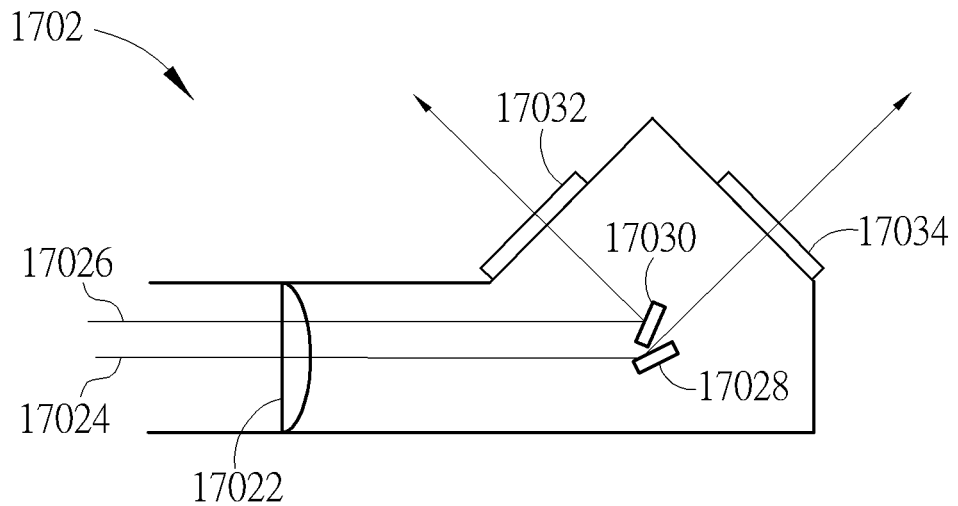
FIGS. 14E-14J are diagrams illustrating a light source group utilizing at least one laser beam and at least two mirrors to generate structured light with 180 degree emitting angle toward the front and the rear.
Figure 14F:
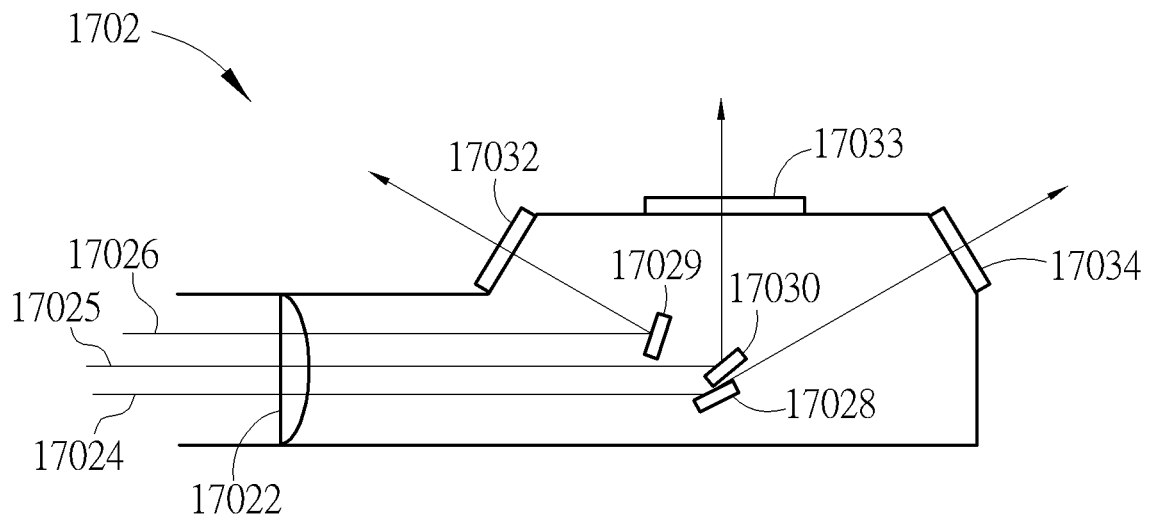
Figure 14G:
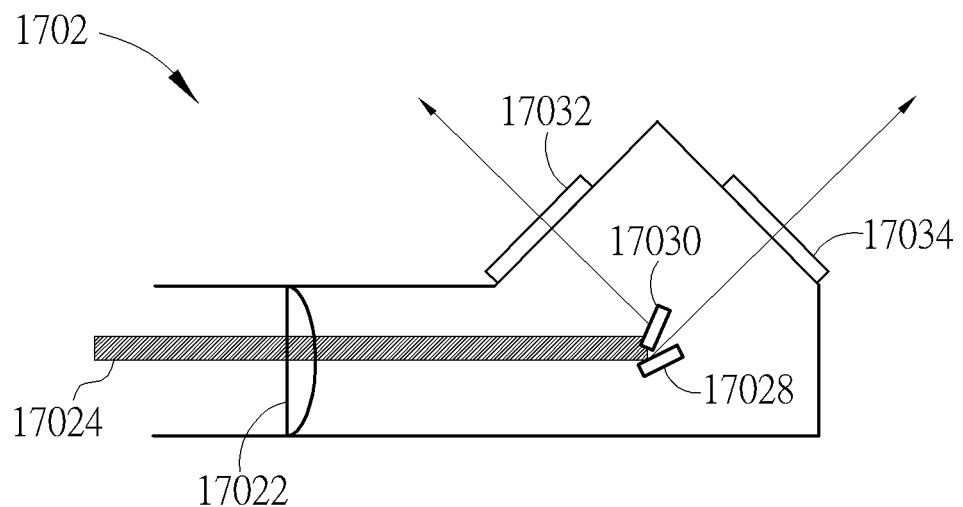
Figure 14H:
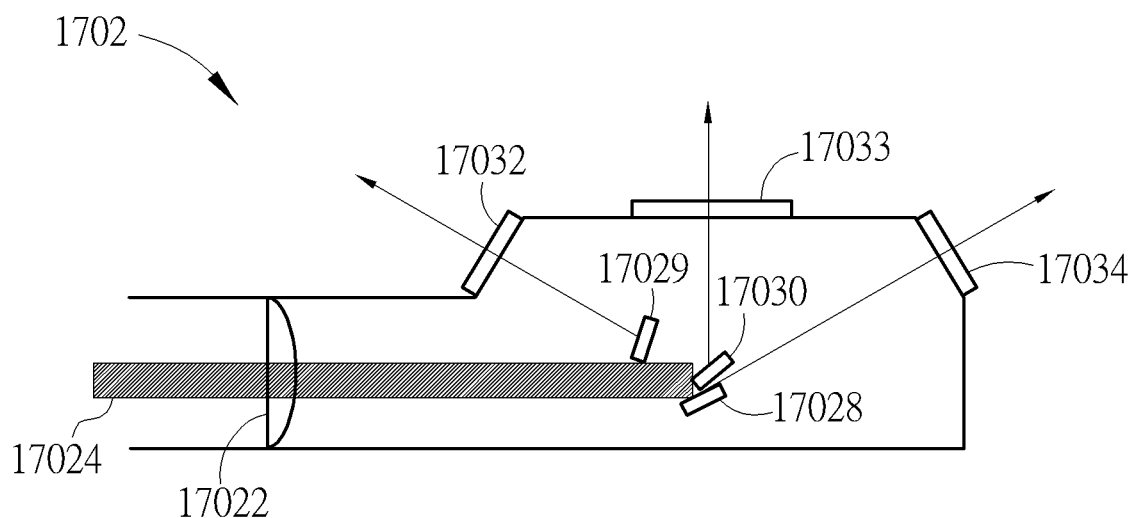
Figure 14I:
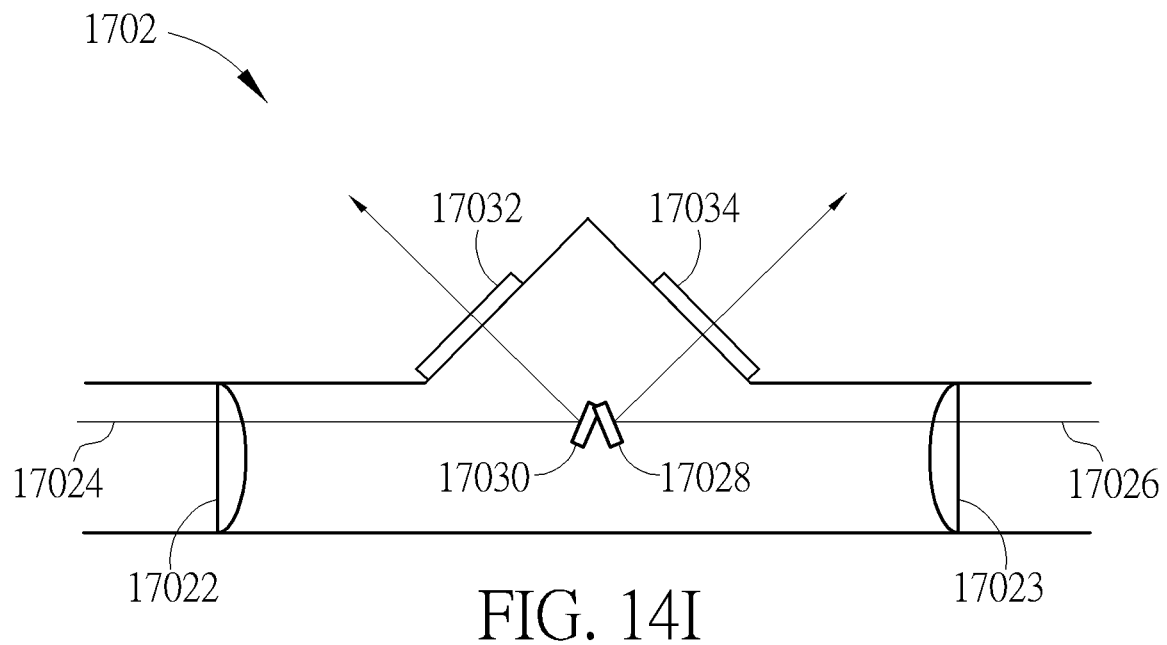
Figure 14J:
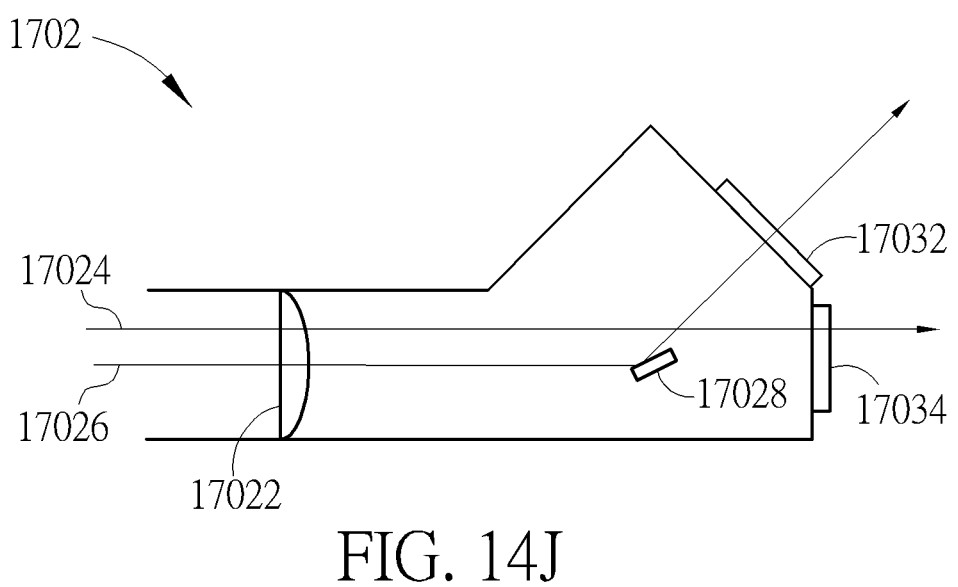

In addition, the light source group 1702 can utilize at least one laser beam (e.g. at least one infrared laser beam) and at least one reflecting element (e.g. at least two mirrors) to generate at least two laser beams with different angles toward the front and the rear (wherein the direction of the front and the direction of the rear can be referred to FIG. 14A) respectively, and then make the at least two laser beams with different angles pass through an optical element (e.g. a diffraction element) to form light sources with 180 degree emitting angle toward the front and the rear. In addition, in another embodiment of the present invention, the light source group 1702 can utilize the at least one laser beam and at least one refracting element to form the light sources with 180 degree emitting angle toward the front and the rear. As shown in FIG. 14E, the light source group 1702 utilizes a collimator 17022, laser beams 17024, 17026, mirrors 17028, 17030, and diffraction optical elements (DOEs) 17032, 17034 to generate the structured light with 180 degree emitting angle; as shown in FIG. 14F, the light source group 1702 utilizes the collimator 17022, laser beams 17024, 17025, 17026, mirrors 17028, 17029, 17030, and diffraction optical elements 17032, 17033, 17034 to generate the structured light with 180 degree emitting angle; as shown in FIG. 14G, the light source group 1702 utilizes the collimator 17022, the laser beam 17024, the mirrors 17028, 17030, and the diffraction optical elements 17032, 17034 to generate the structured light with 180 degree emitting angle; as shown in FIG. 14H, the light source group 1702 utilizes the collimator 17022, the laser beam 17024, the mirrors 17028, 17029, 17030, and the diffraction optical elements 17032, 17033, 17034 to generate the structured light with 180 degree emitting angle; as shown in FIG. 14I, the light source group 1702 utilizes collimators 17022, 17023, the laser beams 17024, 17026, the mirrors 17028, 17030, and the diffraction optical elements 17032, 17034 to generate the structured light with 180 degree emitting angle; and as shown in FIG. 14J, the light source group 1702 utilizes the collimator 17022, the laser beams 17024, 17026, the mirror 17028, and the diffraction optical elements 17032, 17034 to generate the structured light with 180 degree emitting angle. In addition, in FIGS. 14E-14J, the collimator 17022 and the diffraction optical elements 17032, 17033, 17034 are not necessary. In addition, the structured light with 180 degree emitting angle can be not emitted toward the image capturer IC21 and the image capturer IC22 to prevent image capturing functions of the image capturer IC21 and the image capturer IC22 from being influenced. In addition, in another embodiment of the present invention, the optical element can be replaced with a diffuser to form a uniform light source with 180 degree emitting angle.

Figure 14K:
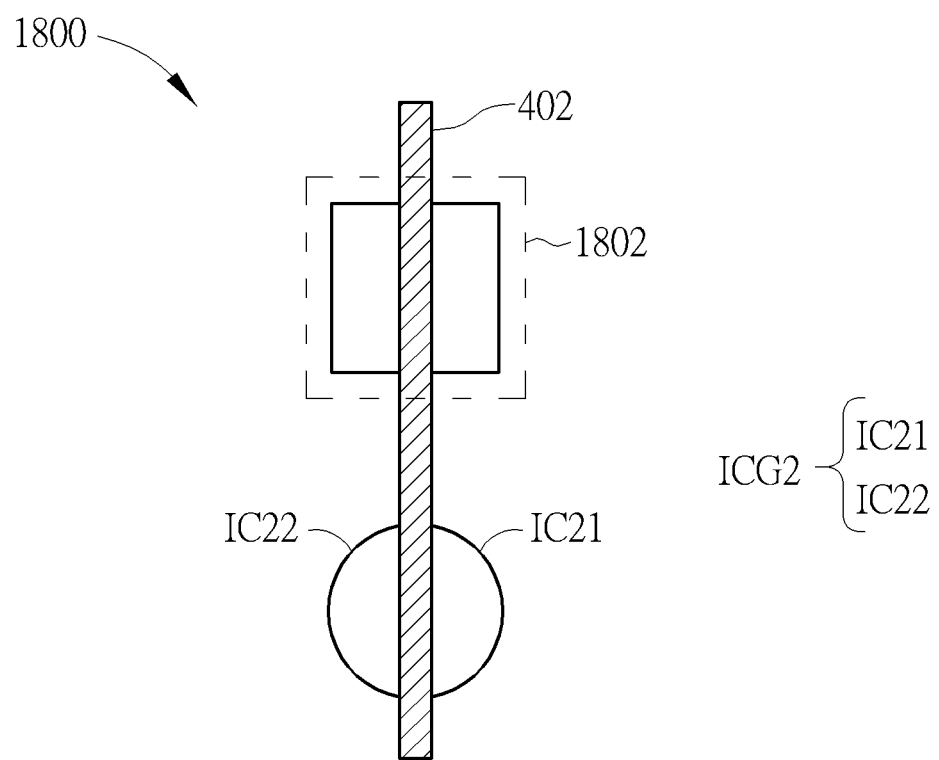
FIG. 14K is a diagram illustrating an image device for generating panoramic depth images according to another embodiment of the present invention.

In addition, in another embodiment of the present invention, as shown in FIG. 14K, a difference between an image device 1800 for generating panoramic depth images and the image device 1400 is that the image device 1800 utilizes a light source group 1802 to substitute for the image capturing group ICG1 (or substitute for the image capturing group ICG2), wherein for simplifying FIG. 14K, FIG. 14K does not show the depth generator 702 and the panoramic depth image generator 704. In addition, in another embodiment of the present invention, the image capturing group ICG2 can be replaced with the first image capturer IC1 shown in FIG. 14C. As shown in FIG. 14K, the image capturing group ICG2 can receive reflection light generated by each object within a receiving range of the image capturing group ICG2 reflecting light emitted by the light source group 1802, and the depth generator 702 can calculate a distance between the each object and the image device 1800 according to total flight time for the light emitted by the light source group 1802 passing from the image device 1800 to the each object and passing from the each object to the image device 1800 after the light emitted by the light source group 1802 is reflected by the each object. Then, the depth generator 702 can generate a depth map facing the front and a depth map facing the rear according to the distance between the each object and the image device 1800. In addition, subsequent operational principles of the image device 1800 are the same as those of the image device 1400, so further description thereof is omitted for simplicity.

Figure 16:
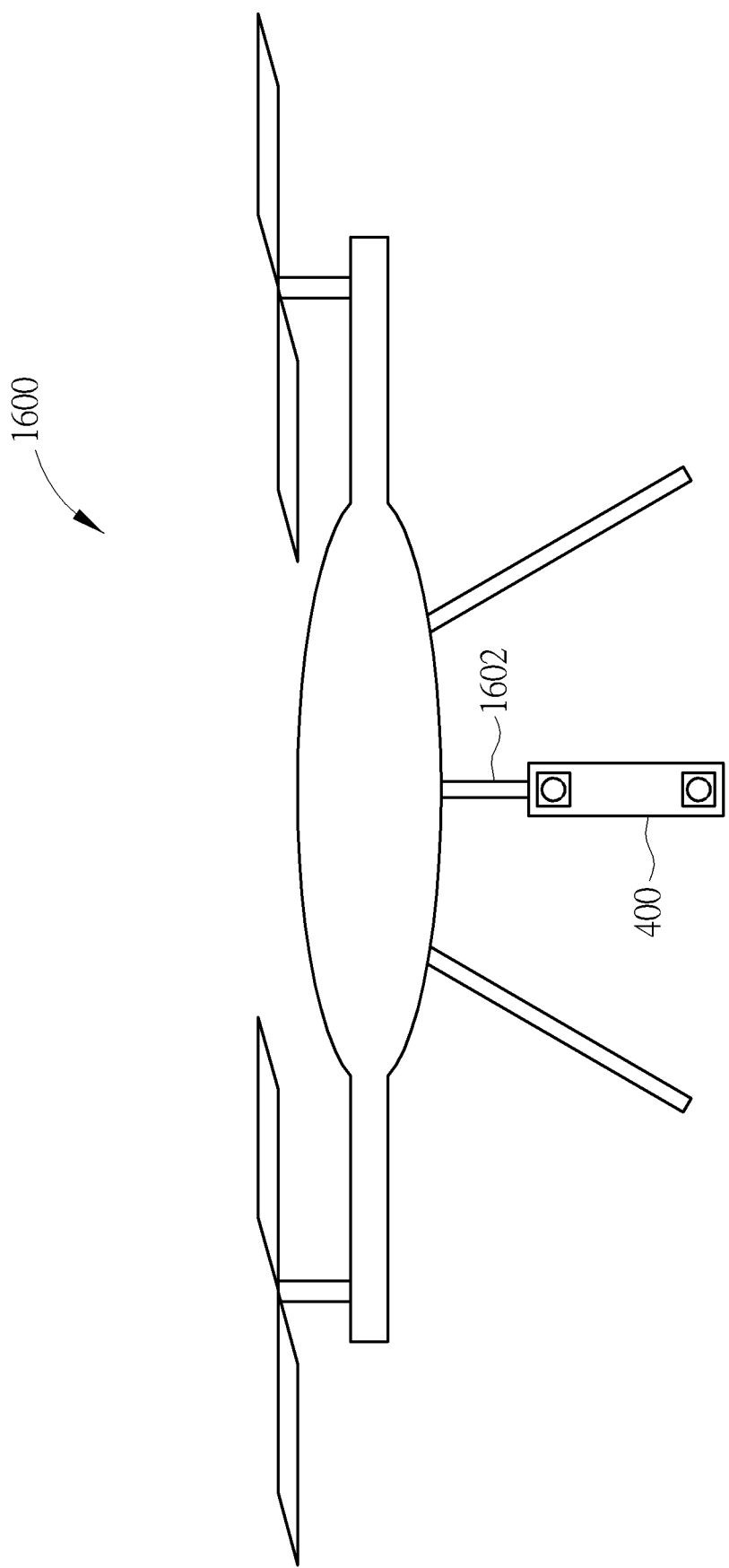
FIGS. 16, 17 are diagrams illustrating the image device being applied to the drone.
Figure 17:
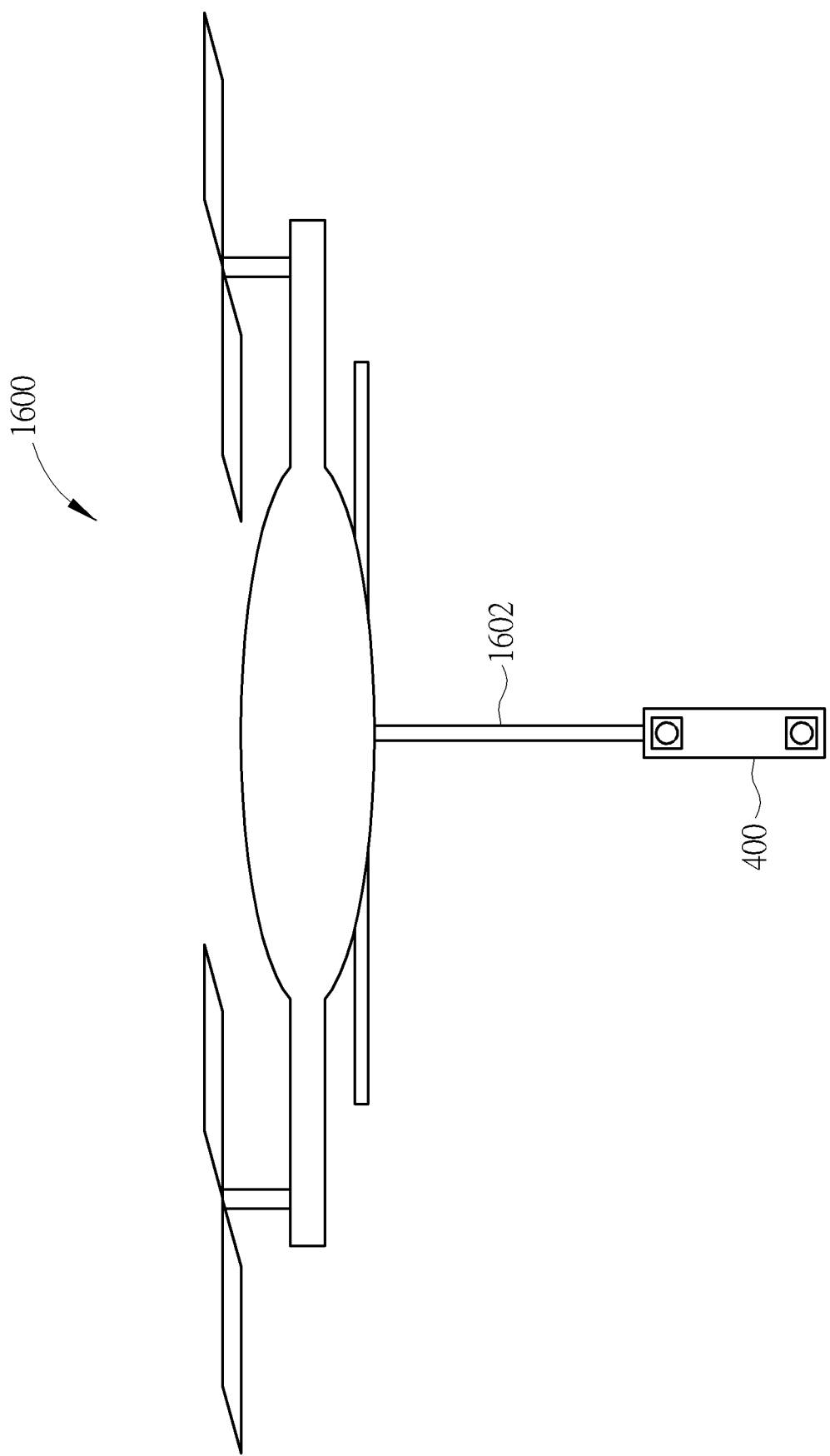

Please refer to FIGS. 16, 17. FIGS. 16, 17 are diagrams illustrating the image device 400 being applied to a drone 1600. As shown in FIG. 16, the image device 400 is hanged below a drone 1600 through a boom 1602. after the drone 1600 takes off, the boom 1602 can lower the image device 400 to make the image device 400 capture more images of a top visual field of the image device 400 (as shown in FIG. 17). In addition, the image devices 500, 600, 1400, 1500, 1600, 1700, 1800 can be applied to the drone 1600, so further description thereof is omitted for simplicity.

To sum up, because a distance between an optical center of each image capturer of each image capturing group of the image device and optical centers of adjacent image capturers of the each image capturing group is much less than a distance between the optical center of the each image capturer and an optical center of at least one corresponding image capturer of other image capturing groups of the image device, compared to the prior art, the image device not only can provide a panoramic depth image, a panoramic image, or a depth image, but can also solve mechanism contradiction generated by the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device for generating panoramic depth images, comprising:
   at least two image capturing groups, wherein each image capturing group of the at least two image capturing groups comprises at least three image capturers, a distance between two adjacent image capturers of the at least three image capturers is a first length, a distance between each image capturer of the at least three image capturers and at least one corresponding image capturer of other image capturing groups of the at least two image capturing groups is a second length, a ratio of the second length to the first length is not less than 1, and the at least two image capturing groups are located on different planes, respectively;
   wherein depths of at least three depth maps corresponding to the at least two image capturing groups are applied to generating a panoramic depth image.

2. An image device for generating panoramic depth images, comprising:
   at least two image capturing groups, wherein each image capturing group of the at least two image capturing groups comprises at least three image capturers, a distance between two adjacent image capturers of the at least three image capturers is a first length, a distance between each image capturer of the at least three image capturers and at least one corresponding image capturer of other image capturing groups of the at least two image capturing groups is a second length, and a ratio of the second length to the first length is not less than 1; and
   at least three supporting units, wherein the each image capturer is installed on a corresponding supporting unit of the at least three supporting units, and a top view of the at least three supporting units forms a closed convex polygon;
   wherein depths of at least three depth maps corresponding to the at least two image capturing groups are applied to generating a panoramic depth image.

3. The image device of claim 1, wherein a distance between an optical center of the each image capturer and an optical center of an adjacent image capturer of the each image capturing group is less than a distance between the optical center of the each image capturer and an optical center of the at least one corresponding image capturer of the other image capturing groups of the at least two image capturing groups.

4. The image device of claim 1, wherein the each image capturer is a non-fisheye image capturer.

5. The image device of claim 1, wherein a sum of angles of visual fields of the at least three image capturers is greater than 360 degree.

6. The image device of claim 1, wherein a plane where the at least three image capturers are located is parallel to a plane where at least three image capturers comprised in each image capturing group of the other image capturing groups of the at least two image capturing groups are located.

7. The image device of claim 1, further comprising:
   a depth generation circuit coupled to the at least two image capturing groups for generating a depth map according to a first image captured by the each image capturer and at least one second image captured by the at least one corresponding image capturer; and
   a panoramic depth image generation circuit coupled to the depth generation circuit and the each image capturing group for generating the panoramic depth image according to at least three first images captured by the at least three image capturers comprised in the each image capturing group and the depths of at least three depth maps.

8. The image device of claim 7, wherein when the at least three depth maps are applied to generating the panoramic depth image, each original depth of each depth map of the at least three depth maps defined by a plane where a corresponding optical center corresponding to the each depth map is located is converted into a converted depth defined by taking the corresponding optical center as an origin.

9. The image device of claim 1, further comprising:
   a panoramic image generation circuit coupled to the at least two image capturing groups for generating a panoramic image corresponding to the each image capturing group according to at least three images captured by the at least three-image capturers of the each image capturing group;
   a panoramic depth image generation circuit coupled to the panoramic image generation circuit for generating the panoramic depth image according to at least two panoramic images corresponding to the at least two image capturing groups; and
   a display coupled to the panoramic depth image generation circuit for displaying the panoramic depth image.

10. The image device of claim 9, wherein the panoramic depth image generation circuit divides view angles corresponding to the panoramic image into a plurality of predetermined view angles, projects two different panoramic images of the at least two panoramic images on a first imaging plane and a second imaging plane to generate a first projection image and a second projection image according to a predetermined view angle of the plurality of predetermined view angles respectively, generates a depth map corresponding to the predetermined view angle according to the first projection image and the second projection image, repeats a step for generating the depth map corresponding to the predetermined view angle to generate depth maps corresponding to the plurality of predetermined view angles, and generates the panoramic depth image according to the depth maps corresponding to the plurality of predetermined view angles and the two different panoramic images.

11. The image device of claim 10, wherein the first imaging plane and the second imaging plane are parallel to an imaging plane of the display, and the plurality of predetermined view angles are identical or different.

12. The image device of claim 1, further comprising:
   at least one supporting unit, wherein the at least two image capturing groups are connected to each other through the at least one supporting unit.

13. The image device of claim 1, further comprising:
at least two fixed units, wherein the each image capturing group of the at least two image capturing groups is fixed by at least one corresponding fixed unit of the at least two fixed unit.

14. An image device for generating panoramic depth images, comprising:
at least two image capturing groups, wherein each image capturing group of the at least two image capturing groups comprises at least two image capturers, a distance between two adjacent image capturers of the at least two image capturers is a first length, a distance between each image capturer of the at least two image capturers and at least one corresponding image capturer of other image capturing groups of the at least two image capturing groups is a second length, a ratio of the second length to the first length is not less than 1, and the at least two image capturing groups are located on different planes, respectively;
wherein depths of at least two depth maps corresponding to the at least two image capturing groups are applied to generating a panoramic depth image.

15. The image device of claim 14, further comprising:
at least one supporting unit, wherein the each image capturer is installed on a corresponding supporting unit of the at least one supporting unit.

16. The image device of claim 14, wherein the each image capturer is a fisheye image capturer.

* * * * *